(12) United States Patent
Mohanram

(10) Patent No.: US 10,581,694 B2
(45) Date of Patent: Mar. 3, 2020

(54) GENERATION OF COUNTER EXAMPLES FOR NETWORK INTENT FORMAL EQUIVALENCE FAILURES

(71) Applicant: Cisco Technology, Inc., San Jose, CA (US)

(72) Inventor: Kartik Mohanram, Pittsburgh, PA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 190 days.

(21) Appl. No.: 15/693,174

(22) Filed: Aug. 31, 2017

(65) Prior Publication Data

US 2018/0351818 A1 Dec. 6, 2018

Related U.S. Application Data

(60) Provisional application No. 62/513,218, filed on May 31, 2017.

(51) Int. Cl.
*H04L 12/24* (2006.01)
*H04L 12/26* (2006.01)

(52) U.S. Cl.
CPC ........ *H04L 41/142* (2013.01); *H04L 41/0873* (2013.01); *H04L 41/0893* (2013.01);
(Continued)

(58) Field of Classification Search
None
See application file for complete search history.

(56) References Cited

U.S. PATENT DOCUMENTS

| 5,204,829 A | 4/1993 | Lyu et al. |
| 6,763,380 B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

Lopes et al., "Automatically verifying reachability and well-formedness in P4 Networks," Microsoft, accessed on Jul. 18, 2018, pp. 1-13.

(Continued)

*Primary Examiner* — Shirley X Zhang
(74) *Attorney, Agent, or Firm* — Polsinelli PC

(57) ABSTRACT

Systems, methods, and computer-readable media for generating counterexamples for equivalence failures between models of network intents. A listing of conflict rules corresponding to an equivalence failure between at least first and seconds model of networks intents describing the operation and communication of network devices in a network is obtained. A logical exclusive disjunction between first conflict rules from the first model and corresponding second conflict rules from the second model is calculated. One or more counterexamples corresponding to the equivalence failure are generated based at least in part on the logical exclusive disjunction, such that a given counterexample comprises network and packet conditions that cause the first conflict rules to trigger a first action and cause the second conflict rules to trigger a second action that is different from the first action. Hot fields that are more likely to be associated with the equivalence failure are identified in the counterexample.

20 Claims, 13 Drawing Sheets

(52) U.S. Cl.
CPC ............ *H04L 41/145* (2013.01); *H04L 41/16* (2013.01); *H04L 41/0631* (2013.01); *H04L 43/10* (2013.01)

(56) References Cited

U.S. PATENT DOCUMENTS

| | | | |
|---|---|---|---|
| 7,003,562 | B2 | 2/2006 | Mayer |
| 7,089,369 | B2 | 8/2006 | Emberling |
| 7,127,686 | B2 | 10/2006 | Dreschler et al. |
| 7,360,064 | B1 | 4/2008 | Steiss et al. |
| 7,453,886 | B1 | 11/2008 | Allan |
| 7,505,463 | B2 | 3/2009 | Schuba et al. |
| 7,548,967 | B2 | 6/2009 | Amyot et al. |
| 7,552,201 | B2 | 6/2009 | Areddu et al. |
| 7,609,647 | B2 | 10/2009 | Turk et al. |
| 7,619,989 | B2 | 11/2009 | Guingo et al. |
| 7,698,561 | B2 | 4/2010 | Nagendra et al. |
| 7,743,274 | B2 | 6/2010 | Langford et al. |
| 7,765,093 | B2 | 7/2010 | Li et al. |
| 8,010,952 | B2 | 8/2011 | Datla et al. |
| 8,073,935 | B2 | 12/2011 | Viswanath, Sr. |
| 8,103,480 | B2 | 1/2012 | Korn et al. |
| 8,190,719 | B2 | 5/2012 | Furukawa |
| 8,209,738 | B2 | 6/2012 | Nicol et al. |
| 8,261,339 | B2 | 9/2012 | Aldridge et al. |
| 8,312,261 | B2 | 11/2012 | Rao et al. |
| 8,375,117 | B2 | 2/2013 | Venable, Sr. |
| 8,441,941 | B2 | 5/2013 | McDade et al. |
| 8,479,267 | B2 | 7/2013 | Donley et al. |
| 8,484,693 | B2 | 7/2013 | Cox et al. |
| 8,494,977 | B1 | 7/2013 | Yehuda et al. |
| 8,554,883 | B2 | 10/2013 | Sankaran |
| 8,589,934 | B2 | 11/2013 | Makljenovic et al. |
| 8,621,284 | B2 | 12/2013 | Kato |
| 8,627,328 | B2 | 1/2014 | Mousseau et al. |
| 8,693,344 | B1 | 4/2014 | Adams et al. |
| 8,761,036 | B2 | 6/2014 | Fulton et al. |
| 8,782,182 | B2 | 7/2014 | Chaturvedi et al. |
| 8,824,482 | B2 | 9/2014 | Kajekar et al. |
| 8,910,143 | B2 | 12/2014 | Cohen et al. |
| 8,914,843 | B2 | 12/2014 | Bryan et al. |
| 8,924,798 | B2 | 12/2014 | Jerde et al. |
| 9,019,840 | B2 | 4/2015 | Salam et al. |
| 9,038,151 | B1 | 5/2015 | Chua et al. |
| 9,055,000 | B1 | 6/2015 | Ghosh et al. |
| 9,106,555 | B2 | 8/2015 | Agarwal et al. |
| 9,137,096 | B1 | 9/2015 | Yehuda et al. |
| 9,225,601 | B2 | 12/2015 | Khurshid et al. |
| 9,246,818 | B2 | 1/2016 | Deshpande et al. |
| 9,264,922 | B2 | 2/2016 | Gillot et al. |
| 9,276,877 | B1 | 3/2016 | Chua et al. |
| 9,319,300 | B2 | 4/2016 | Huynh Van et al. |
| 9,344,348 | B2 | 5/2016 | Ivanov et al. |
| 9,369,434 | B2 | 6/2016 | Kim et al. |
| 9,389,993 | B1 | 7/2016 | Okmyanskiy et al. |
| 9,405,553 | B2 | 8/2016 | Branson et al. |
| 9,444,842 | B2 | 9/2016 | Porras et al. |
| 9,497,207 | B2 | 11/2016 | Dhawan et al. |
| 9,497,215 | B2 | 11/2016 | Vasseur et al. |
| 9,544,224 | B2 | 1/2017 | Chu et al. |
| 9,548,965 | B2 | 1/2017 | Wang et al. |
| 9,553,845 | B1 | 1/2017 | Talmor et al. |
| 9,571,502 | B2 | 2/2017 | Basso et al. |
| 9,571,523 | B2 | 2/2017 | Porras et al. |
| 9,594,640 | B1 | 3/2017 | Chheda |
| 9,596,141 | B2 | 3/2017 | McDowall |
| 9,641,249 | B2 | 5/2017 | Kaneriya et al. |
| 9,654,300 | B2 | 5/2017 | Pani |
| 9,654,361 | B2 | 5/2017 | Vasseur et al. |
| 9,654,409 | B2 | 5/2017 | Yadav et al. |
| 9,660,886 | B1 | 5/2017 | Ye et al. |
| 9,667,645 | B1 | 5/2017 | Belani et al. |
| 9,680,875 | B2 | 6/2017 | Knjazihhin et al. |
| 9,686,180 | B2 | 6/2017 | Chu et al. |
| 9,690,644 | B2 | 6/2017 | Anderson et al. |
| 9,781,004 | B2 | 10/2017 | Danait et al. |
| 2002/0143855 | A1 | 10/2002 | Traversat et al. |
| 2003/0229693 | A1 | 12/2003 | Mahlik et al. |
| 2004/0073647 | A1 | 4/2004 | Gentile et al. |
| 2004/0168100 | A1 | 8/2004 | Thottan et al. |
| 2005/0108389 | A1 | 5/2005 | Kempin et al. |
| 2007/0011629 | A1 | 1/2007 | Shacham et al. |
| 2007/0124437 | A1 | 5/2007 | Chervets |
| 2007/0214244 | A1 | 9/2007 | Hitokoto et al. |
| 2008/0031147 | A1 | 2/2008 | Fieremans et al. |
| 2008/0117827 | A1 | 5/2008 | Matsumoto et al. |
| 2008/0133731 | A1 | 6/2008 | Bradley et al. |
| 2008/0172716 | A1 | 7/2008 | Talpade et al. |
| 2009/0240758 | A1 | 9/2009 | Pasko et al. |
| 2009/0249284 | A1 | 10/2009 | Antosz et al. |
| 2010/0191612 | A1 | 7/2010 | Raleigh |
| 2010/0198909 | A1 | 8/2010 | Kosbab et al. |
| 2011/0093612 | A1 | 4/2011 | Murakami |
| 2011/0295983 | A1 | 12/2011 | Medved et al. |
| 2012/0054163 | A1 | 3/2012 | Liu et al. |
| 2012/0198073 | A1 | 8/2012 | Srikanth et al. |
| 2012/0297061 | A1 | 11/2012 | Pedigo et al. |
| 2013/0097660 | A1 | 4/2013 | Das et al. |
| 2014/0019597 | A1 | 1/2014 | Nath et al. |
| 2014/0222996 | A1 | 8/2014 | Vasseur et al. |
| 2014/0304831 | A1 | 10/2014 | Hidlreth et al. |
| 2014/0307556 | A1 | 10/2014 | Zhang |
| 2014/0321277 | A1 | 10/2014 | Lynn, Jr. et al. |
| 2014/0379915 | A1 | 12/2014 | Yang et al. |
| 2015/0019756 | A1 | 1/2015 | Masuda |
| 2015/0124826 | A1 | 5/2015 | Edsall et al. |
| 2015/0244617 | A1 | 8/2015 | Nakil et al. |
| 2015/0271104 | A1 | 9/2015 | Chikkamath et al. |
| 2015/0365314 | A1 | 12/2015 | Hiscock et al. |
| 2016/0020993 | A1 | 1/2016 | Wu et al. |
| 2016/0026631 | A1 | 1/2016 | Salam et al. |
| 2016/0028589 | A1* | 1/2016 | Devarajan ............... H04L 41/12 370/249 |
| 2016/0036636 | A1 | 2/2016 | Erickson et al. |
| 2016/0080350 | A1 | 3/2016 | Chaturvedi et al. |
| 2016/0099883 | A1* | 4/2016 | Voit ..................... H04L 41/0873 709/226 |
| 2016/0112269 | A1* | 4/2016 | Singh .................. H04L 41/0853 709/224 |
| 2016/0149751 | A1 | 5/2016 | Pani et al. |
| 2016/0164748 | A1 | 6/2016 | Kim |
| 2016/0241436 | A1 | 8/2016 | Fourie et al. |
| 2016/0267384 | A1 | 9/2016 | Salam et al. |
| 2016/0352566 | A1 | 12/2016 | Mekkattuparamban et al. |
| 2016/0380892 | A1 | 12/2016 | Mahadevan et al. |
| 2017/0026292 | A1 | 1/2017 | Smith et al. |
| 2017/0048126 | A1 | 2/2017 | Handige Shankar et al. |
| 2017/0054601 | A1* | 2/2017 | Affoneh ............... H04L 41/0869 |
| 2017/0063599 | A1 | 3/2017 | Wu et al. |
| 2017/0093630 | A1 | 3/2017 | Foulkes |
| 2017/0093664 | A1 | 3/2017 | Lynam et al. |
| 2017/0093750 | A1 | 3/2017 | McBride et al. |
| 2017/0093918 | A1 | 3/2017 | Banerjee et al. |
| 2017/0111259 | A1 | 4/2017 | Wen et al. |
| 2017/0118167 | A1 | 4/2017 | Subramanya et al. |
| 2017/0126740 | A1 | 5/2017 | Bejarano Ardila et al. |
| 2017/0126792 | A1 | 5/2017 | Halpern et al. |
| 2017/0134233 | A1 | 5/2017 | Dong et al. |
| 2017/0163442 | A1 | 6/2017 | Shen et al. |
| 2017/0187577 | A1 | 6/2017 | Nevrekar et al. |
| 2017/0195187 | A1 | 7/2017 | Bennett et al. |
| 2017/0206129 | A1 | 7/2017 | Yankilevich et al. |
| 2017/0228649 | A1* | 8/2017 | Chatterjee ............. G06F 9/5005 |
| 2017/0353355 | A1 | 12/2017 | Danait et al. |
| 2018/0115470 | A1* | 4/2018 | Huang ................ H04L 41/0873 |
| 2018/0309629 | A1* | 10/2018 | Mohanram ......... H04L 41/0873 |
| 2018/0309640 | A1* | 10/2018 | Nagarajan ............ H04L 41/145 |
| 2018/0351804 | A1* | 12/2018 | Mohanram ............. H04L 67/00 |

(56) References Cited

U.S. PATENT DOCUMENTS

2018/0367396 A1* 12/2018 Kompella ........... H04L 41/0869
2018/0367413 A1* 12/2018 Kompella ............ H04L 41/145

FOREIGN PATENT DOCUMENTS

| CN | 105721297 | 6/2016 |
|---|---|---|
| CN | 106130766 | 11/2016 |
| CN | 106603264 | 4/2017 |
| CN | 103701926 | 6/2017 |
| EP | 3160083 A1 | 4/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS de Silva et al., "Network-wide Security Analysis," Semantic Scholar, Oct. 25, 2011, pp. 1-11.
Liang et al., "SIFT: Building an Internet of Safe Things," Microsoft, IPSN' 15, Apr. 14-16, 2015, Seattle, WA, ACM 978, pp. 1-12.
International Search Report and Written Opinion, dated Aug. 22, 2018, 13 pages, from the International Searching Authority for the corresponding International Application No. PCT/US2018/034302.
Maldonado-Lopez, Ferney, et al., "Detection and prevention of firewall—rule conflicts on software-defined networking," 2015 $7^{th}$ International Workshop on Reliable Networks Design and Modeling (RNDM), IEEE, Oct. 5, 2015, pp. 259-265.
Author Unknown, "Aids to Pro-active Management of Distributed Resources through Dynamic Fault-Localization and Availability Prognosis," FaultLocalization-TR01-CADlab, May 2006, pp. 1-9.
Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.
Cisco, "Verify Contracts and Rules in the ACI Fabric," Cisco, Updated Aug. 19, 2016, Document ID: 119023, pp. 1-20.
Fayaz, Seyed K., et al., "Efficient Network Reachability Analysis using a Succinct Control Plane Representation," 2016, ratul.org, pp. 1-16.
Feldmann, Anja, et al., "IP Network Configuration for Intradomain Traffic Engineering," Semantic Scholar, accessed on Jul. 20, 2017, pp. 1-27.
Han, Yoonseon, et al., "An Intent-based Network Virtualization Platform for SDN," 2016 I FIP, pp. 1-6.
Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111.
Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.
Le, Franck, et al., "Minerals: Using Data Mining to Detect Router Misconfigurations," CyLab, Carnegie Mellon University, CMU-CyLab-06-008, May 23, 2006, pp. 1-14.
Liu, Jason, et al., "A Real-Time Network Simulation Infrastructure Based on Open VPN," Journal of Systems and Software, Aug. 4, 2008, pp. 1-45.
Mai, Haohui, et al., "Debugging the Data Plane with Anteater," SIGCOMM11, Aug. 15-19, 2011, pp. 112.
Miller, Nancy, et al., "Collecting Network Status Information for Network-Aware Applications," INFOCOM 2000, pp. 1-10.
Miranda, Joao Sales Henriques, "Fault Isolation in Software Defined Networks," www.gsd.inescid.pt, pp. 1-10.
Moon, Daekyeong, et al., "Bridging the Software/Hardware Forwarding Divide," Berkeley.edu, Dec. 18, 2010, pp. 1-15.
Shin, Seugwon, et al., "FRESCO: Modular Composable Security Services for Software-Defined Networks," To appear in the ISOC Network and Distributed System Security Symposium, Feb. 2013, pp. 1-16.
Shukla, Apoorv, et al., "Towards meticulous data plane monitoring," kaust.edu.sa, access on Aug. 1, 2017, pp. 1-2.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA '07), Nov. 11-16, 2007, pp. 1-14.
Zhou, Shijie, et al., "High-Performance Packet Classification on GPU," 2014 IEEE, pp. 1-6.
Akella, Aditya, et al., "A Highly Available Software Defined Fabric," HotNets-XIII, Oct. 27-28, 2014, Los Angeles, CA, USA, Copyright 2014, ACM, pp. 1-7.
Alsheikh, Mohammad Abu, et al., "Machine Learning in Wireless Sensor Networks: Algorithms, Strategies, and Application," Mar. 19, 2015, pp. 1-23.
Cisco Systems, Inc., "Cisco Application Centric Infrastructure 9 ACl Endpoint Groups (EPG) Usange and Design," White Paper, May 2014, pp. 1-14.
Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.
Lindem, A., et al., "Network Device YANG Organizational Model draft-rtgyangdt-rtgwg-device-model-01," Network Working Group, Internet-draft, Sep. 21, 2015, pp. 1-33.
Panda, Aurojit, et al., "SCL: Simplifying Distributed SDN Control Planes," people.eecs.berkeley.edu, Mar. 2017, pp. 1-17.
Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

\* cited by examiner

GENERATION OF COUNTER EXAMPLES FOR NETWORK INTENT FORMAL EQUIVALENCE FAILURES

CROSS-REFERENCE TO RELATED APPLICATIONS

This application claims the benefit of, and priority to, U.S. Provisional Patent Application No. 62/513,218 filed on May 31, 2017, entitled "GENERATION OF COUNTER EXAMPLES FOR NETWORK INTENT FORMAL EQUIVALENCE FAILURES", the contents of which are hereby expressly incorporated by reference in its entirety.

TECHNICAL FIELD

The present technology pertains to network configuration and troubleshooting, and more specifically to the generation of counterexamples corresponding to network intent formal equivalence failures.

BACKGROUND

Computer networks are becoming increasingly complex, often involving low level as well as high level configurations at various layers of the network. For example, computer networks generally include numerous access policies, forwarding policies, routing policies, security policies, quality-of-service (QoS) policies, etc., which together define the overall behavior and operation of the network. Network operators have a wide array of configuration options for tailoring the network to the needs of the users. While the different configuration options available provide network operators a great degree of flexibility and control over the network, they also add to the complexity of the network. In many cases, the configuration process can become highly complex. Not surprisingly, the network configuration process is increasingly error prone. In addition, troubleshooting errors in a highly complex network can be extremely difficult. The process of identifying the root cause of undesired behavior in the network can be a daunting task.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
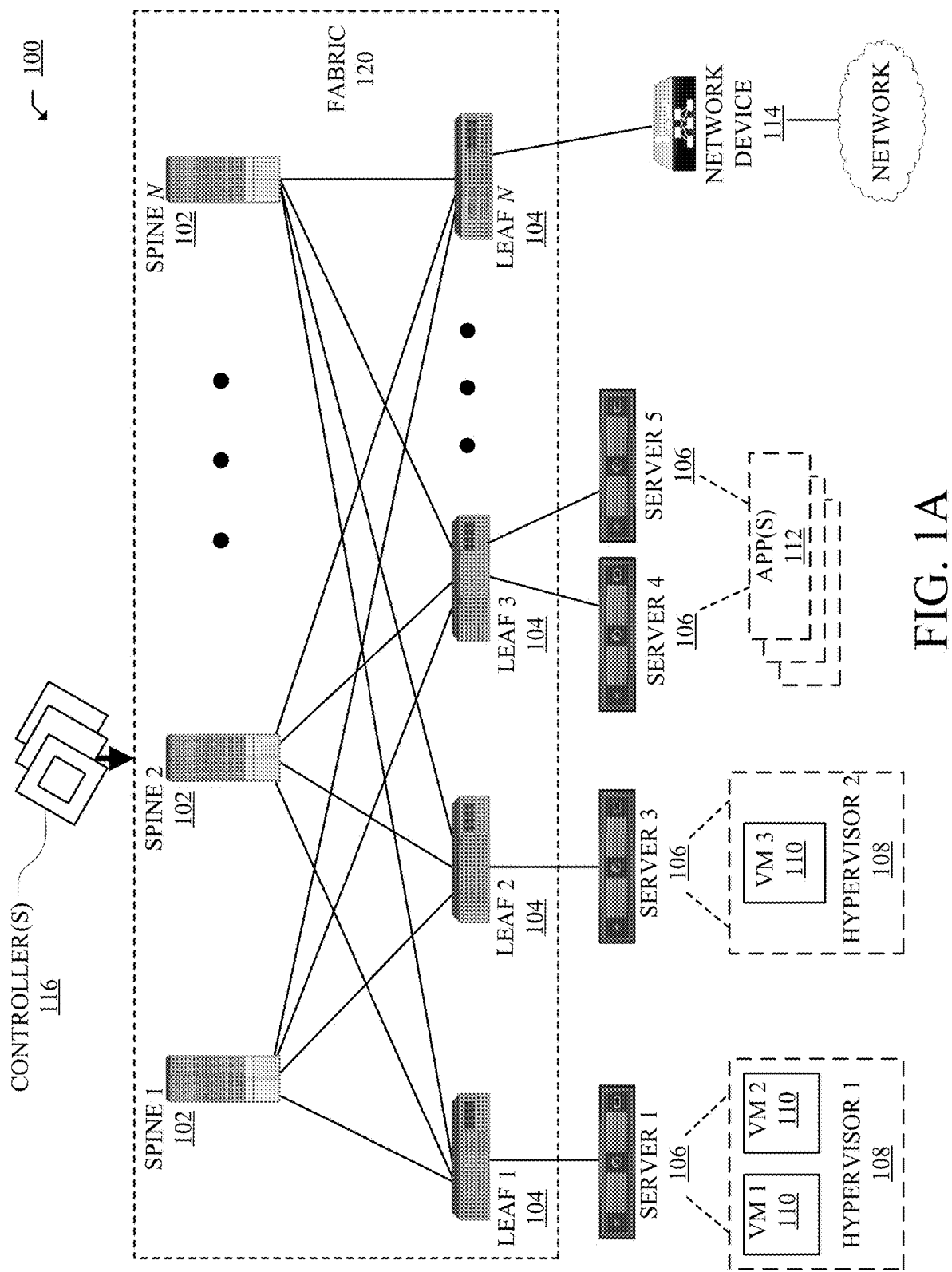
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for generating counterexamples pertaining to identified conflict rules derived from two or more models of network intents that have failed a formal equivalence check or are otherwise not congruent (e.g. a software-defined logical intent is not rendered correctly into a switch as a corresponding hardware intent). In some examples, the generation of counterexamples might be truncated by a truncation parameter in order to aid computational efficiency.

A logical model of network intents can be a model generated based on configurations defined in one or more controllers or servers in a software-defined network (SDN), such as an APIC (application policy infrastructure controller) in an ACI (application-centric infrastructure) network. The logical model can thus represent the logical configuration of the SDN network (e.g., a representation of the logical configurations in the ACI). The logical configuration of the SDN network can be based on the configurations defined by the network operator for the SDN network, such as the configurations entered into the APIC of an ACI network, and may thus reflect the intent of the network operator or the intended behavior of the SDN network.

A hardware model of network intents can be a model generated based on the logical model. The hardware model can thus represent the hardware rendering of the discrete software-defined components that comprise the logical model. Often times, there is not a one-to-one correspondence between a software-defined logical intent and a hardware-defined intent. For example, the hardware rendering of the logical model might cause a single logical intent to be broken into multiple different hardware intents. This is not problematic in and of itself, as long as the multiple hardware intents capture the exact same effect as the single logical intent. However, conventional network assurance processes struggle to make this determination of equivalency, as it requires a comparison of two models of network intents that do not have a congruent form. As such, it would be desirable to provide intelligent network assurance via systems and methods for identifying conflict rules between two or more models of network intents that are not necessarily congruent in form or in composition.

Description

Figure 1B:
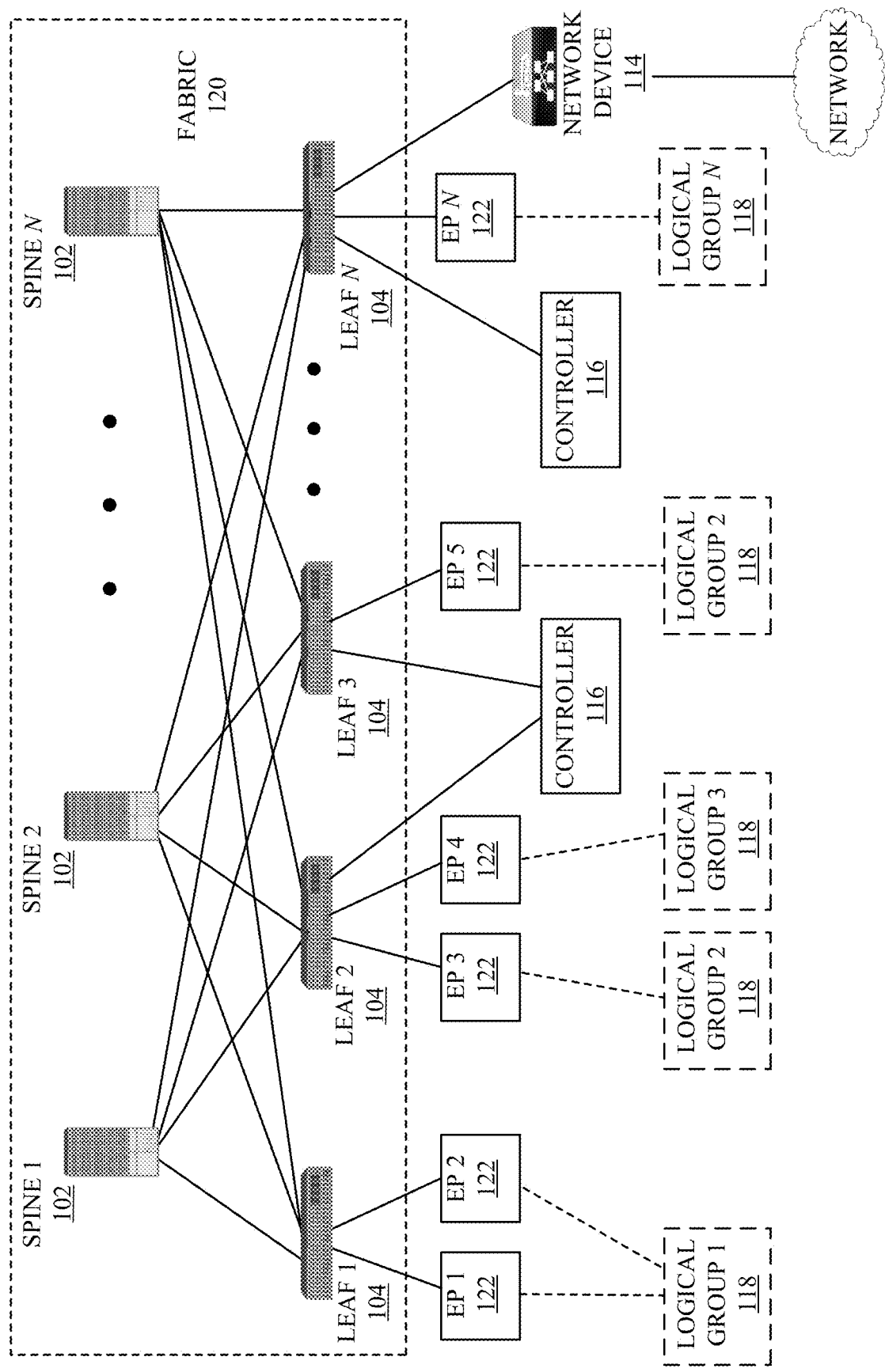
Figure 5:
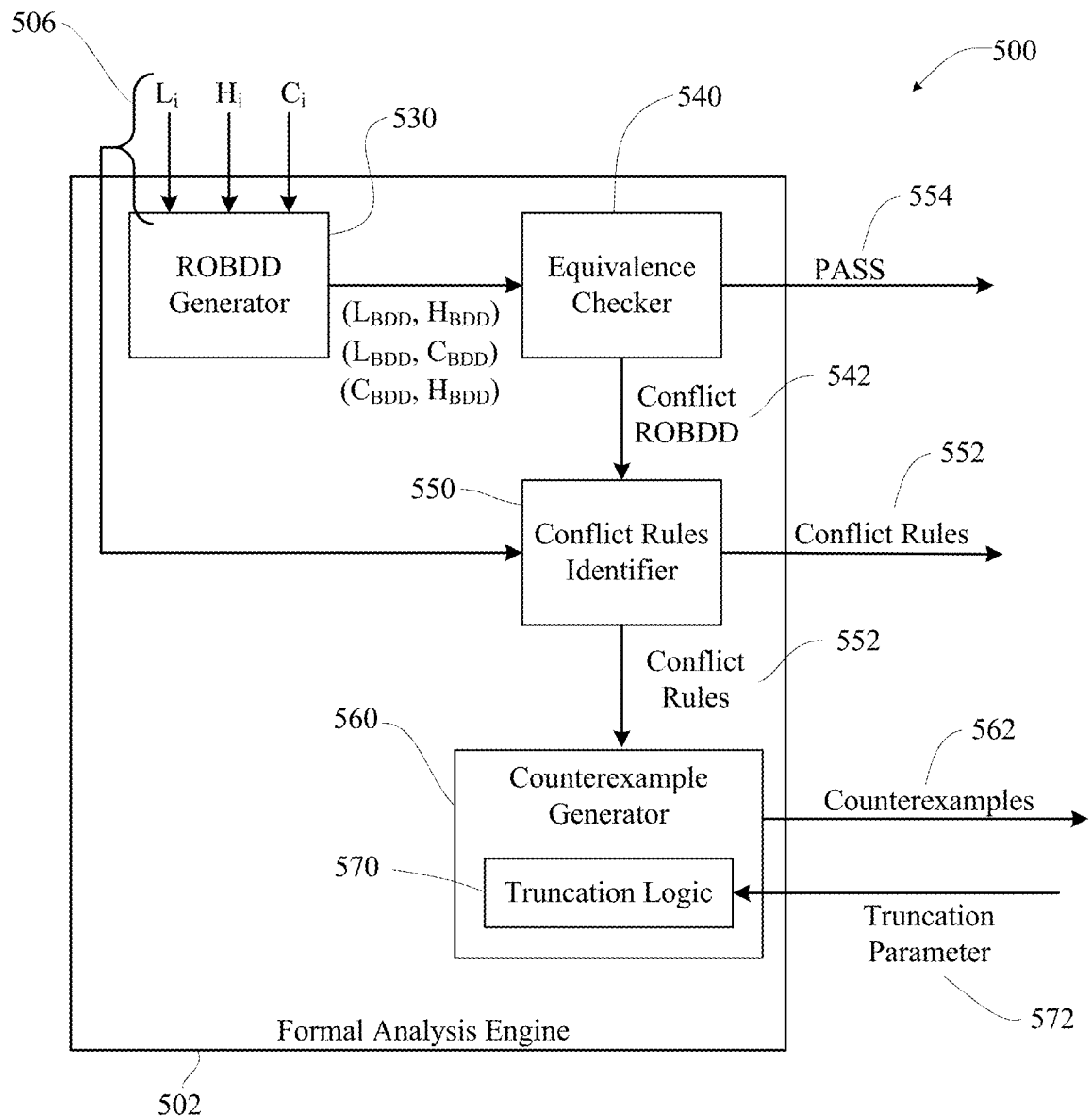
FIG. 5 illustrates an example architecture for generation of counterexamples.
Figure 6:
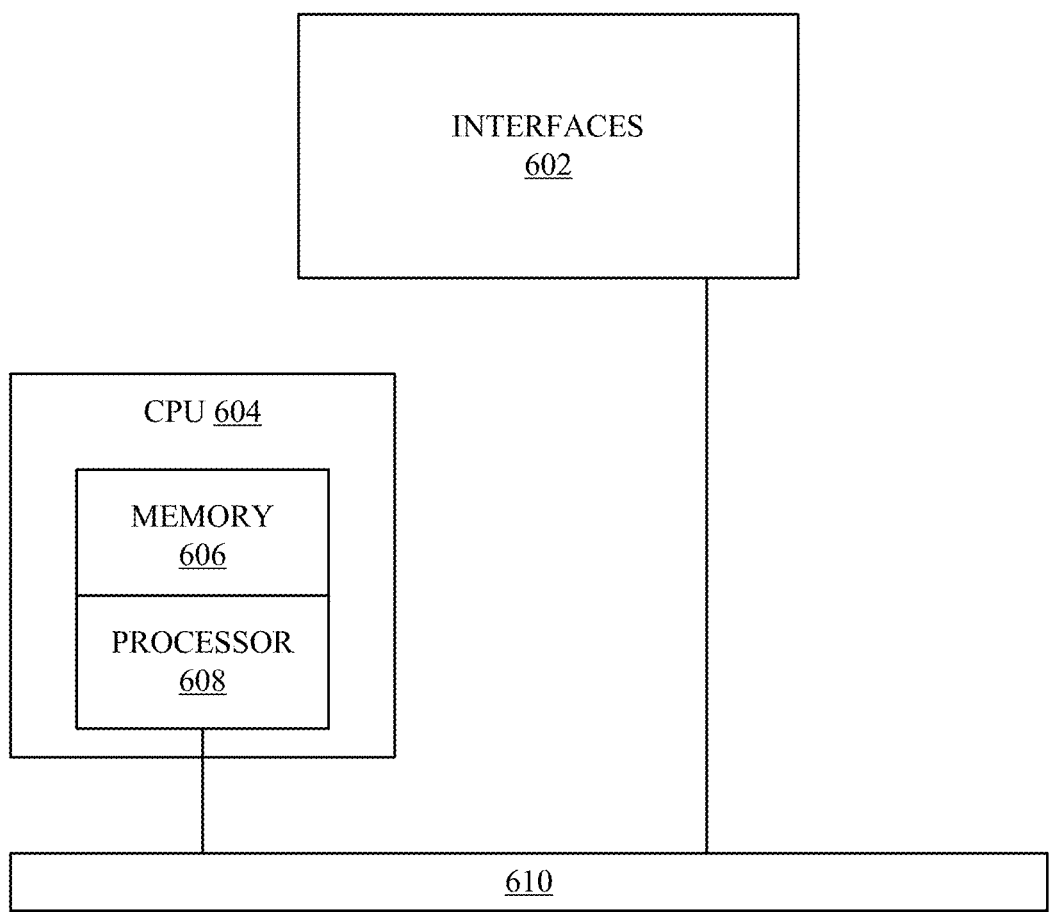
FIG. 6 illustrates an example network device in accordance with various embodiments.
Figure 7:
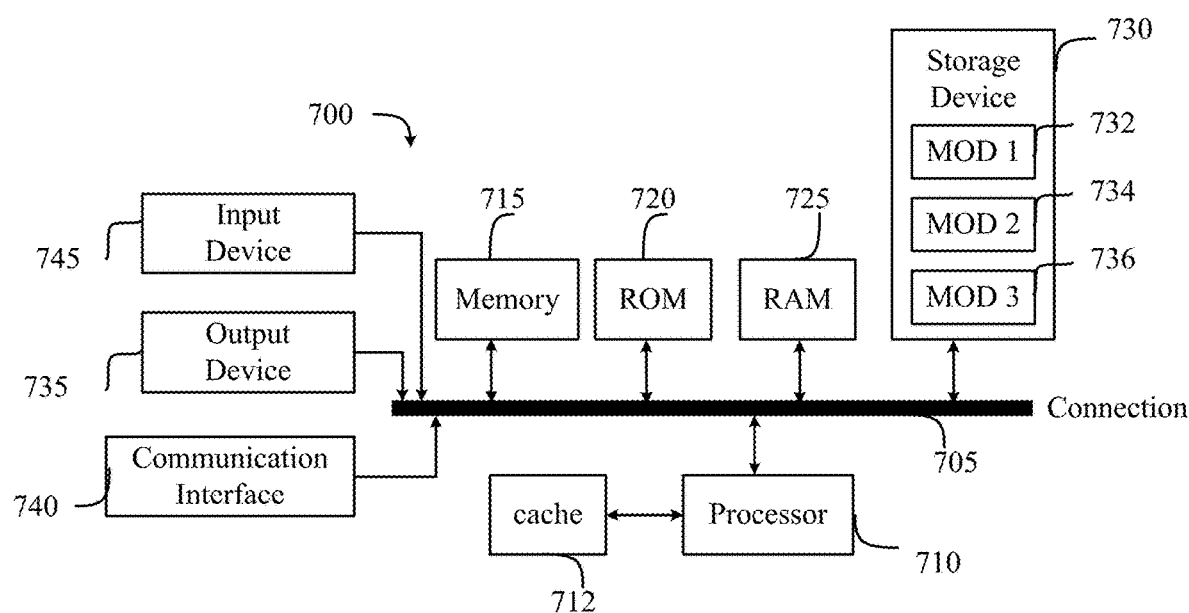
FIG. 7 illustrates an example computing device in accordance with various embodiments.

The disclosed technology addresses the need in the art for a reliable and efficient ability to generate counterexamples for conflict rules or other equivalence failures between two or more models of network intents. In particular, counterexamples can comprise one or more packet configurations or network actions that cause the conflict rules to generate different network actions or outcomes. The present technology involves systems, methods, and computer-readable media for receiving as input a set of conflict rules between two or more models of network intents, and generating one or more counterexamples corresponding to the input set of conflict rules. The present technology will be subsequently described as follows. The discussion begins with an introductory discussion of network assurance and a description of example computing environments, as illustrated in FIGS. 1A and 1B. The discussion continues with a description of systems and methods for network assurance, network modeling, and event generation, as shown in FIGS. 2A-2D, 3A-C, and 4. The discussion moves next to an example formal analysis architecture for identification of conflict rules and generation of counterexamples, as illustrated in FIG. 5. The discussion then concludes with a description of an example network device, as illustrated in FIG. 6, and an example computing device, as illustrated in FIG. 7, including example hardware components suitable for hosting software applications and performing computing operations. The disclosure now turns to a discussion of network assurance, the analysis and execution of which is a precursor to the event generation in accordance with embodiments of the present disclosure.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc. The approaches herein can also enable identification and visualization of hardware-level (e.g., network switch-level) errors along any software or application-centric dimension. In this manner, data center operators can quickly see hardware errors that impact particular tenants or other logical entities, across the entire network fabric, and even drill down by other dimensions, such as endpoint groups, to see only those relevant hardware errors. These visualizations speed root cause analysis, improving data center and application availability metrics.

Logical models can be implemented to represent various aspects of a network. A model can include a mathematical or semantic model of the network, including, without limitation the network's policies, configurations, requirements, security, routing, topology, applications, hardware, filters, contracts, access control lists, EPGs, application profiles, tenants, etc. Models can be implemented to provide network assurance to ensure that the network is properly configured and the behavior of the network will be consistent (or is consistent) with the intended behavior reflected through specific policies, settings, definitions, etc., implemented by the network operator. Unlike traditional network monitoring which involves sending and analyzing data packets and observing network behavior, network assurance can be performed through modeling without necessarily ingesting any packet data or monitoring traffic or network behavior. This can result in foresight, insight, and hindsight: problems can be prevented before they occur, identified when they occur, and fixed immediately after they occur.

Properties of the network can be mathematically modeled to deterministically predict the behavior and condition of the network. A mathematical model can abstract the control, management, and data planes, and may use various techniques such as symbolic, formal verification, consistency, graph, behavioral, etc. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The models can consume numerous types of data and/or events which model a large amount of behavioral aspects of the network. Such data and events can impact various aspects of the network, such as underlay services, overlay service, tenant connectivity, tenant security, tenant EP mobility, tenant policy, resources, etc.

Having described various aspects of network assurance and fault code aggregation across dimensions, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be permitted among web VMs, and not permitted between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
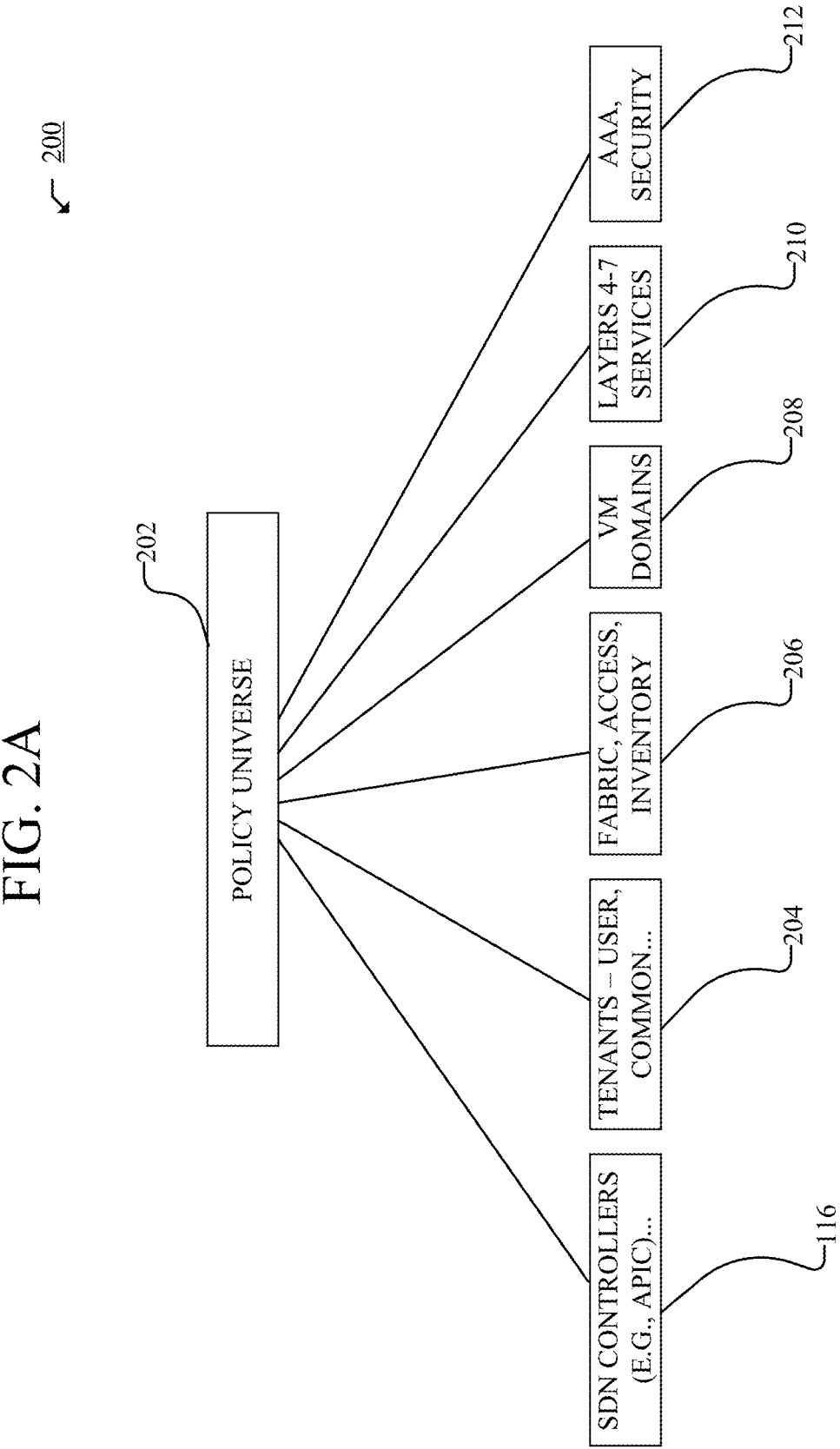
FIG. 2A illustrates an example object model for a network.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, the terms "Aliasing" and "Shadowing" can refer to a rule (e.g., contracts, policies, configurations, etc.) that overlaps one or more other rules. For example, Contract 1 defined in a logical model of a network can be said to be aliasing or shadowing Contract 2 defined in the logical model of the network if Contract 1 overlaps Contract 2. In this example, by aliasing or shadowing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that permits multiple instances of a routing table to exist and work simultaneously. This increases functionality by permitting network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., permitted, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endoints as previously described with reference to FIG. 1B.

As used herein, the term "Filter" can refer to a parameter or configuration for permitting communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to permit inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside L 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that permits multiple instances of a routing table to exist and work simultaneously. This increases functionality by permitting network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, L 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
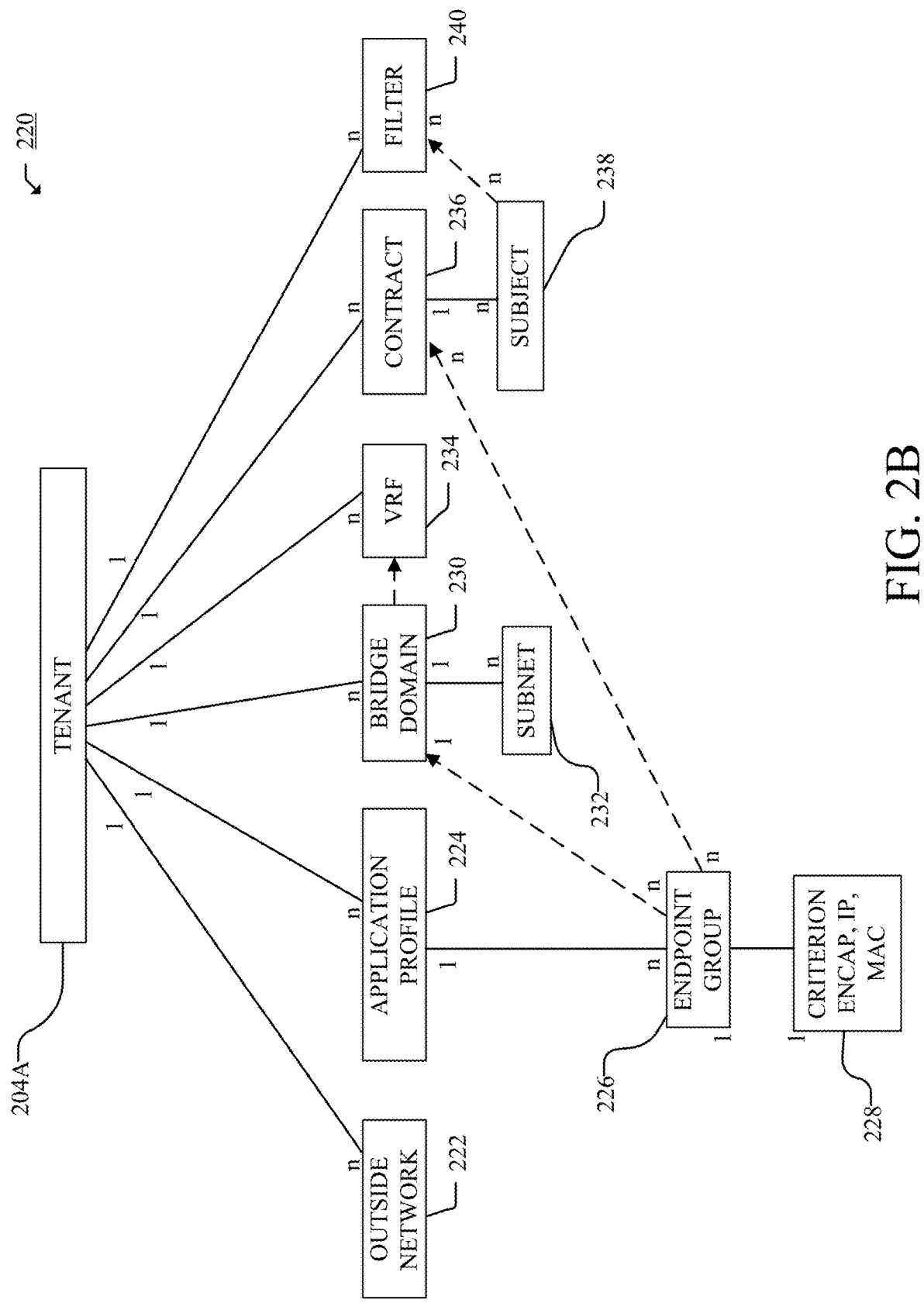
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
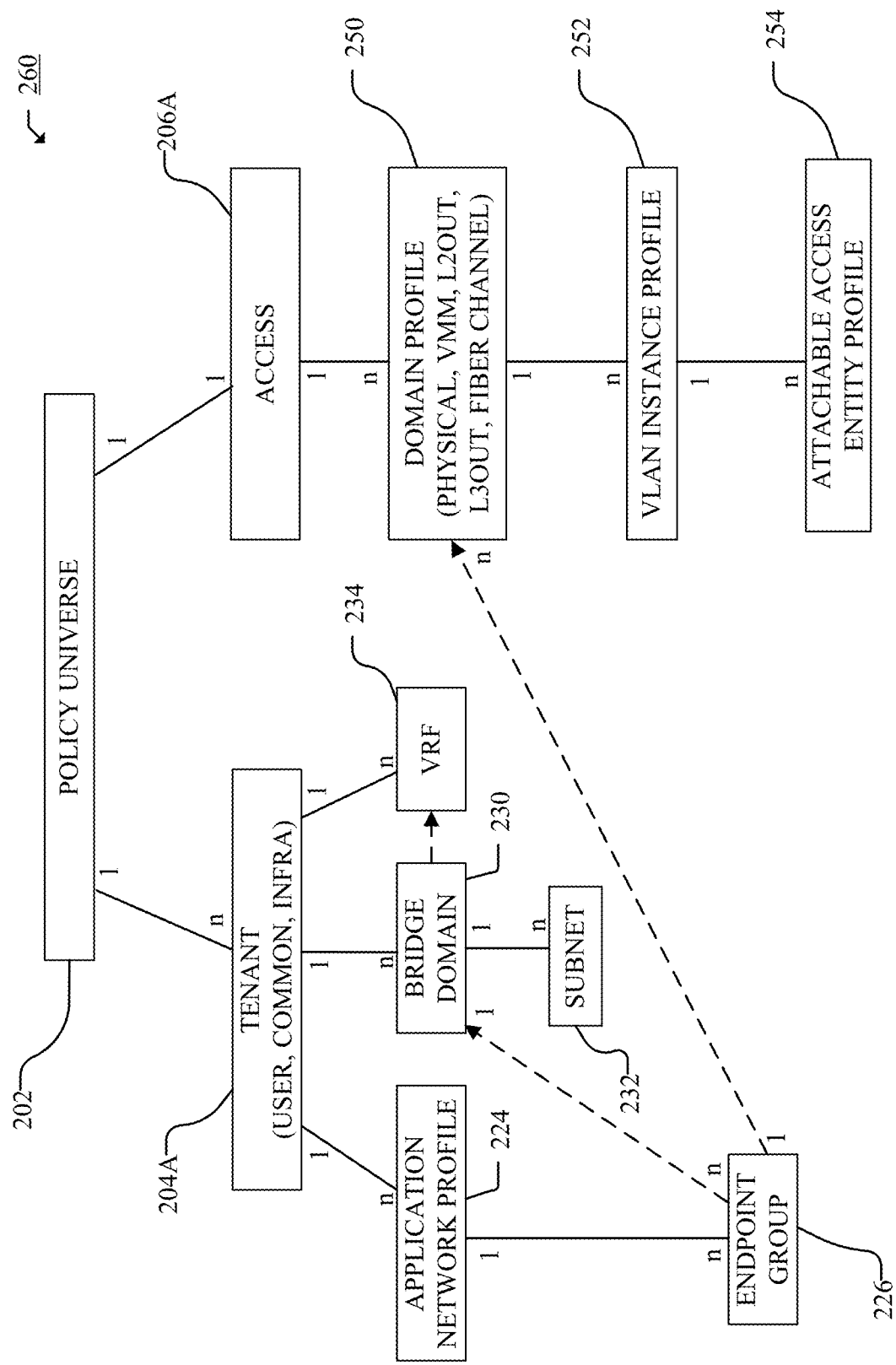
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
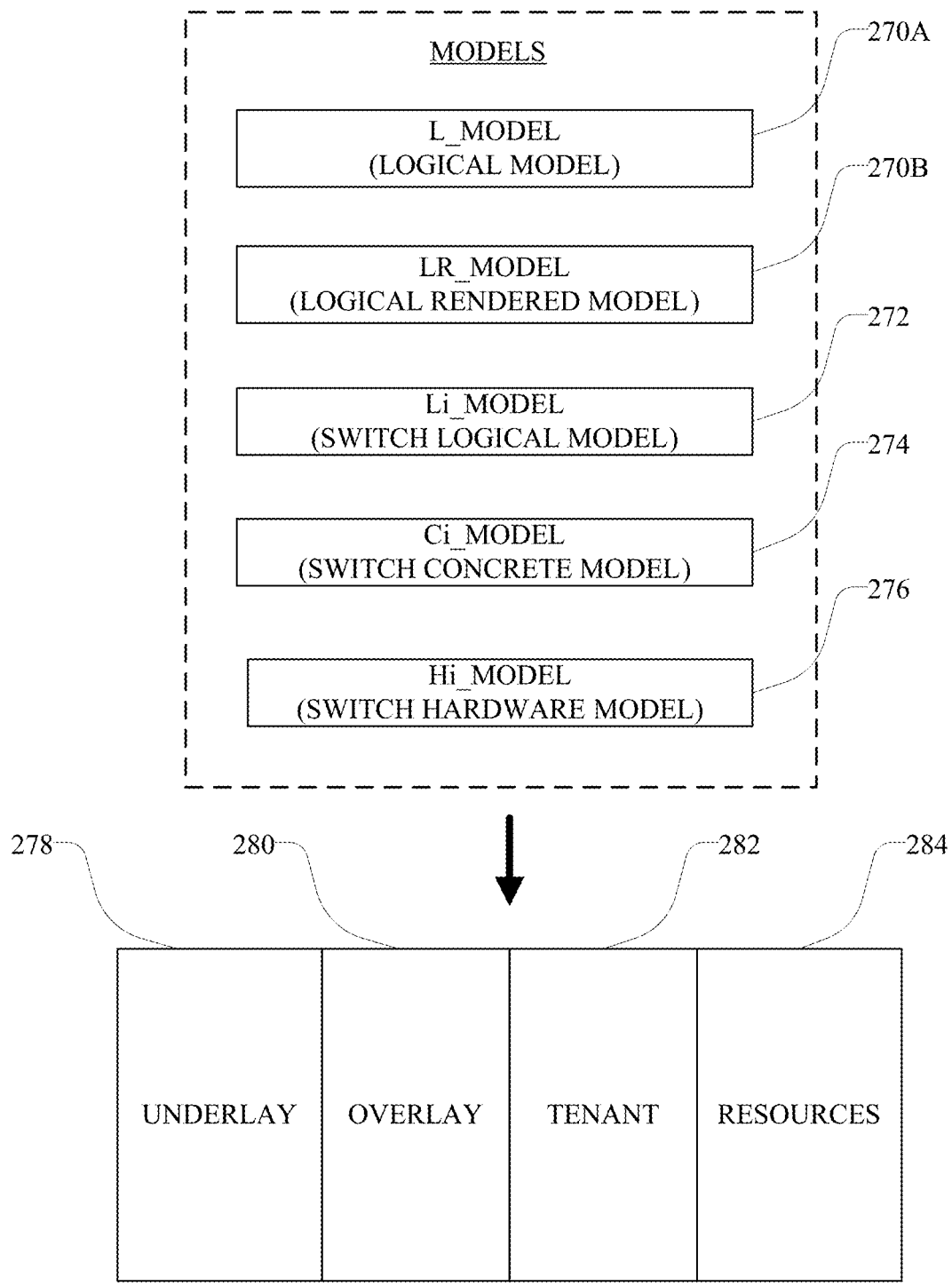
FIG. 2D illustrates a schematic diagram of example models for implementing the example object model from FIG. 2A.

FIG. 2D illustrates a schematic diagram of example models for a network, such as Network Environment 100. The models can be generated based on specific configurations and/or network state parameters associated with various objects, policies, properties, and elements defined in MIM 200. The models can be implemented for network analysis and assurance, and may provide a depiction of the network at various stages of implementation and levels of the network.

As illustrated, the models can include L_Model 270A (Logical Model), LR_Model 270B (Logical Rendered Model or Logical Runtime Model), Li_Model 272 (Logical Model for i), Ci_Model 274 (Concrete model for i), and/or Hi_Model 276 (Hardware model or TCAM Model for i).

L_Model 270A is the logical representation of various elements in MIM 200 as configured in a network (e.g., Network Environment 100), such as objects, object properties, object relationships, and other elements in MIM 200 as configured in a network. L_Model 270A can be generated by Controllers 116 based on configurations entered in Controllers 116 for the network, and thus represents the logical configuration of the network at Controllers 116. This is the declaration of the "end-state" expression that is desired when the elements of the network entities (e.g., applications, tenants, etc.) are connected and Fabric 120 is provisioned by Controllers 116. Because L_Model 270A represents the configurations entered in Controllers 116, including the objects and relationships in MIM 200, it can also reflect the "intent" of the administrator: how the administrator wants the network and network elements to behave.

L_Model 270A can be a fabric or network-wide logical model. For example, L_Model 270A can account configurations and objects from each of Controllers 116. As previously explained, Network Environment 100 can include multiple Controllers 116. In some cases, two or more Controllers 116 may include different configurations or logical models for the network. In such cases, L_Model 270A can obtain any of the configurations or logical models from Controllers 116 and generate a fabric or network wide logical model based on the configurations and logical models from all Controllers 116. L_Model 270A can thus incorporate configurations or logical models between Controllers 116 to provide a comprehensive logical model. L_Model 270A can also address or account for any dependencies, redundancies, conflicts, etc., that may result from the configurations or logical models at the different Controllers 116.

LR_Model 270B is the abstract model expression that Controllers 116 (e.g., APICs in ACI) resolve from L_Model 270A. LR_Model 270B can provide the configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122. LR_Model 270B can also incorporate state information to capture a runtime state of the network (e.g., Fabric 120).

In some cases, LR_Model 270B can provide a representation of L_Model 270A that is normalized according to a specific format or expression that can be propagated to, and/or understood by, the physical infrastructure of Fabric 120 (e.g., Leafs 104, Spines 102, etc.). For example, LR_Model 270B can associate the elements in L_Model 270A with specific identifiers or tags that can be interpreted and/or compiled by the switches in Fabric 120, such as hardware plane identifiers used as classifiers.

Li_Model 272 is a switch-level or switch-specific model obtained from L_Model 270A and/or LR_Model 270B. Li_Model 272 can project L_Model 270A and/or LR_Model 270B on a specific switch or device i, and thus can convey how L_Model 270A and/or LR_Model 270B should appear or be implemented at the specific switch or device i.

For example, Li_Model 272 can project L_Model 270A and/or LR_Model 270B pertaining to a specific switch i to capture a switch-level representation of L_Model 270A and/or LR_Model 270B at switch i. To illustrate, Li_Model 272 $L_1$ can represent L_Model 270A and/or LR_Model 270B projected to, or implemented at, Leaf 1 (104). Thus, Li_Model 272 can be generated from L_Model 270A and/or LR_Model 270B for individual devices (e.g., Leafs 104, Spines 102, etc.) on Fabric 120.

In some cases, Li_Model 272 can be represented using JSON (JavaScript Object Notation). For example, Li_Model 272 can include JSON objects, such as Rules, Filters, Entries, and Scopes.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

In some cases, Li_Model 272 and Ci_Model 274 can have a same or similar format. For example, Li_Model 272 and Ci_Model 274 can be based on JSON objects. Having the same or similar format can facilitate objects in Li_Model 272 and Ci_Model 274 to be compared for equivalence or congruence. Such equivalence or congruence checks can be used for network analysis and assurance, as further described herein.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model 274 in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 274, and/or Hi_Model 276 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
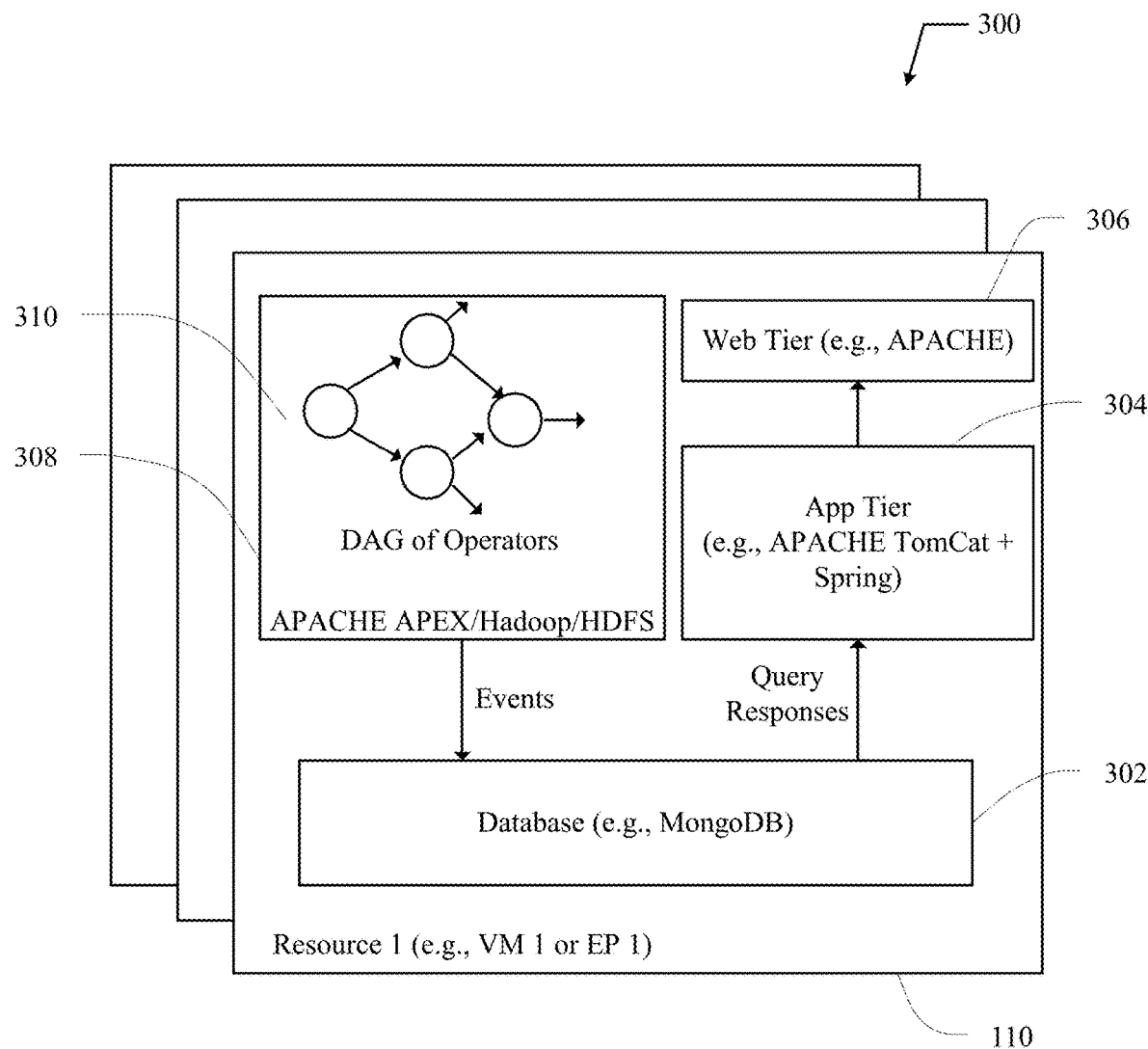
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
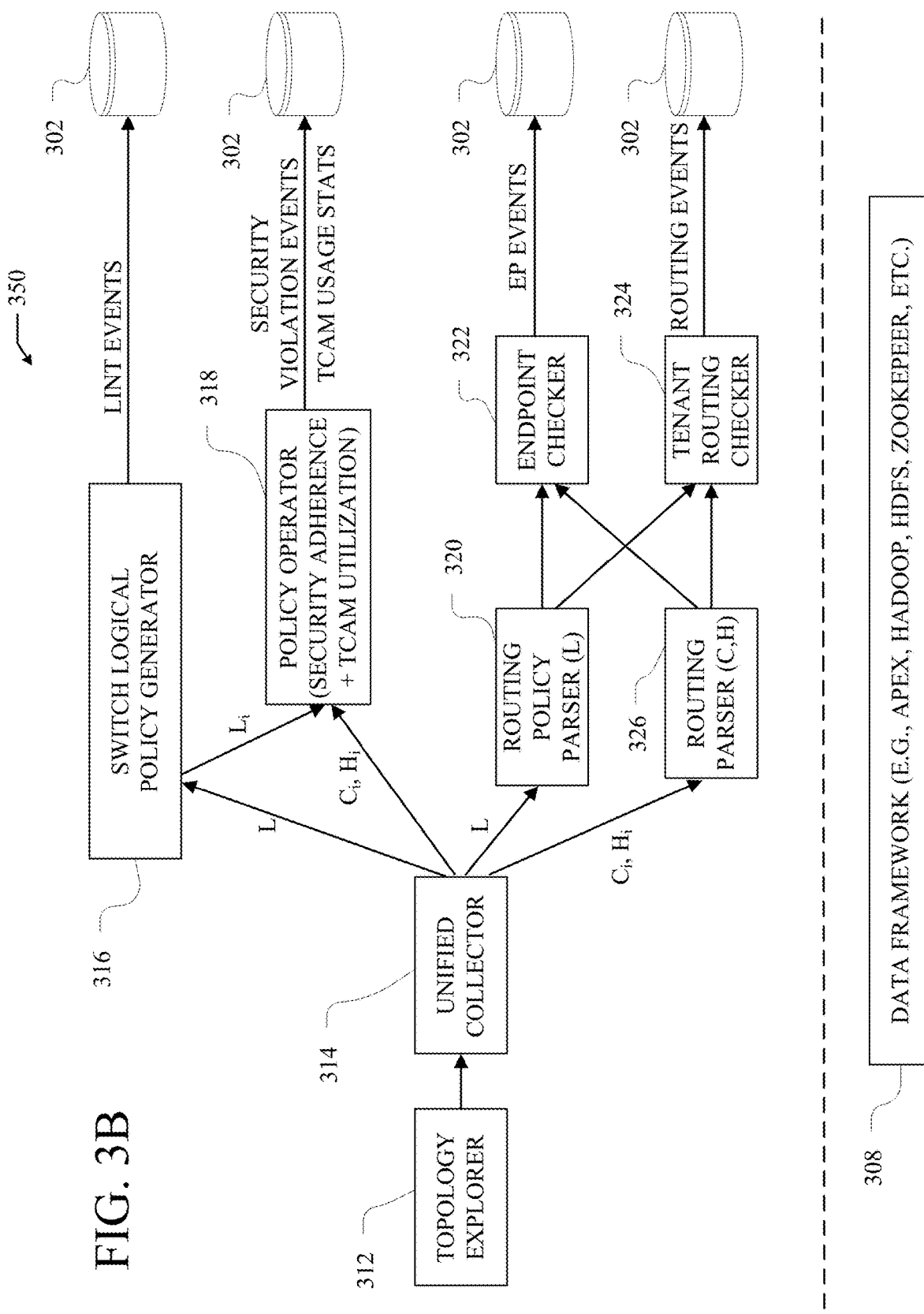
FIG. 3B illustrates an example system for network assurance.

FIG. 3B illustrates an architectural diagram of an example system 350 for network assurance, such as Assurance Appliance 300. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

In some examples, Topology Explorer 312 can receive as input a list of Controllers 116 (e.g., APIC controllers) that are associated with the network/fabric (e.g., Fabric 120). Topology Explorer 312 can also receive corresponding credentials to login to each controller. Topology Explorer 312 can retrieve information from each controller using, for example, REST calls. Topology Explorer 312 can obtain from each controller a list of nodes (e.g., Leafs 104 and Spines 102), and their associated properties, that the controller is aware of. Topology Explorer 312 can obtain node information from Controllers 116 including, without limitation, an IP address, a node identifier, a node name, a node domain, a node URI, a node_dm, a node role, a node version, etc.

Topology Explorer 312 can also determine if Controllers 116 are in quorum, or are sufficiently communicatively coupled amongst themselves. For example, if there are n controllers, a quorum condition might be met when (n/2+1) controllers are aware of each other and/or are communicatively coupled. Topology Explorer 312 can make the determination of a quorum (or identify any failed nodes or controllers) by parsing the data returned from the controllers, and identifying communicative couplings between their constituent nodes. Topology Explorer 312 can identify the type of each node in the network, e.g. spine, leaf, APIC, etc., and include this information in the topology information generated (e.g., topology map or model).

If no quorum is present, Topology Explorer 312 can trigger an event and alert a user that reconfiguration or suitable attention is required. If a quorum is present, Topology Explorer 312 can compile the network topology information into a JSON object and pass it downstream to other operators or services, such as Unified Collector 314.

Unified Collector 314 can receive the topological view or model from Topology Explorer 312 and use the topology information to collect information for network assurance from Fabric 120. Unified Collector 314 can poll nodes (e.g., Controllers 116, Leafs 104, Spines 102, etc.) in Fabric 120 to collect information from the nodes.

Unified Collector 314 can include one or more collectors (e.g., collector devices, operators, applications, VMs, etc.) configured to collect information from Topology Explorer 312 and/or nodes in Fabric 120. For example, Unified Collector 314 can include a cluster of collectors, and each of the collectors can be assigned to a subset of nodes within the topological model and/or Fabric 120 in order to collect information from their assigned subset of nodes. For performance, Unified Collector 314 can run in a parallel, multi-threaded fashion.

Unified Collector 314 can perform load balancing across individual collectors in order to streamline the efficiency of the overall collection process. Load balancing can be optimized by managing the distribution of subsets of nodes to collectors, for example by randomly hashing nodes to collectors.

In some cases, Assurance Appliance 300 can run multiple instances of Unified Collector 314. This can also allow Assurance Appliance 300 to distribute the task of collecting data for each node in the topology (e.g., Fabric 120 including Spines 102, Leafs 104, Controllers 116, etc.) via sharding and/or load balancing, and map collection tasks and/or nodes to a particular instance of Unified Collector 314 with data collection across nodes being performed in parallel by various instances of Unified Collector 314. Within a given node, commands and data collection can be executed serially. Assurance Appliance 300 can control the number of threads used by each instance of Unified Collector 314 to poll data from Fabric 120.

Unified Collector 314 can collect models (e.g., L_Model 270A and/or LR_Model 270B) from Controllers 116, switch software configurations and models (e.g., Ci_Model 274) from nodes (e.g., Leafs 104 and/or Spines 102) in Fabric 120, hardware configurations and models (e.g., Hi_Model 276) from nodes (e.g., Leafs 104 and/or Spines 102) in Fabric 120, etc. Unified Collector 314 can collect Ci_Model 274 and Hi_Model 276 from individual nodes or fabric members, such as Leafs 104 and Spines 102, and L_Model 270A and/or LR_Model 270B from one or more controllers (e.g., Controllers 116) in Network Environment 100.

Unified Collector 314 can poll the devices that Topology Explorer 312 discovers in order to collect data from Fabric 120 (e.g., from the constituent members of the fabric). Unified Collector 314 can collect the data using interfaces exposed by Controllers 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including, without limitation: topology information, tenant forwarding/routing information, tenant security policies, contracts, interface policies, physical domain or VMM domain information, OOB (out-of-band) management IP's of nodes in the fabric, etc.

Unified Collector 314 can also poll information from nodes (e.g., Leafs 104 and Spines 102) in Fabric 120, including without limitation: Ci_Models 274 for VLANs, BDs, and security policies; Link Layer Discovery Protocol (LLDP) connectivity information of nodes (e.g., Leafs 104 and/or Spines 102); endpoint information from EPM/COOP; fabric card information from Spines 102; routing information base (RIB) tables from nodes in Fabric 120; forwarding information base (FIB) tables from nodes in Fabric 120; security group hardware tables (e.g., TCAM tables) from nodes in Fabric 120; etc.

In some cases, Unified Collector 314 can obtain runtime state from the network and incorporate runtime state information into L_Model 270A and/or LR_Model 270B. Unified Collector 314 can also obtain multiple logical models from Controllers 116 and generate a comprehensive or network-wide logical model (e.g., L_Model 270A and/or LR_Model 270B) based on the logical models. Unified Collector 314 can compare logical models from Controllers 116, resolve dependencies, remove redundancies, etc., and generate a single L_Model 270A and/or LR_Model 270B for the entire network or fabric.

Unified Collector 314 can collect the entire network state across Controllers 116 and fabric nodes or members (e.g., Leafs 104 and/or Spines 102). For example, Unified Collector 314 can use a REST interface and an SSH interface to collect the network state. This information collected by Unified Collector 314 can include data relating to the link layer, VLANs, BDs, VRFs, security policies, etc. The state information can be represented in LR_Model 270B, as previously mentioned. Unified Collector 314 can then publish the collected information and models to any downstream operators that are interested in or require such information. Unified Collector 314 can publish information as it is received, such that data is streamed to the downstream operators.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A and/or LR_Model 270B for each switch.

Each Li_Model 272 can represent L_Model 270A and/or LR_Model 270B as projected or applied at the respective network device i (e.g., switch i) in Fabric 120. In some cases, Li_Model 272 can be normalized or formatted in a manner that is compatible with the respective network device. For example, Li_Model 272 can be formatted in a manner that can be read or executed by the respective network device. To illustrate, Li_Model 272 can included specific identifiers (e.g., hardware plane identifiers used by Controllers 116 as classifiers, etc.) or tags (e.g., policy group tags) that can be interpreted by the respective network device. In some cases, Li_Model 272 can include JSON objects. For example, Li_Model 272 can include JSON objects to represent rules, filters, entries, scopes, etc.

The format used for Li_Model 272 can be the same as, or consistent with, the format of Ci_Model 274. For example, both Li_Model 272 and Ci_Model 274 may be based on JSON objects. Similar or matching formats can enable Li_Model 272 and Ci_Model 274 to be compared for equivalence or congruence. Such equivalency checks can aid in network analysis and assurance as further explained herein.

Switch Logical Policy Generator 316 can also perform change analysis and generate lint events or records for problems discovered in L_Model 270A and/or LR_Model 270B. The lint events or records can be used to generate alerts for a user or network operator via an event generator coupled to receive lint events from Switch Logical Policy Generator 316.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models. The output of Policy Operator 318 can be passed to an event generator (not shown) that can generate warning events for external consumption, where the events correspond to security violations or utilization statistics (such as TCAM usage) that comprise a policy violation. Such events are triggered by an abnormal or undesirable network occurrence as determined by the network generator, whereas a notification event might be triggered during the normal course of performing utilization analysis and security adherence checks in the absence of any violations.

Returning to Unified Collector 314, Unified Collector 314 can also send L_Model 270A and/or LR_Model 270B to Routing Policy Parser 320 (for L models), and Ci_Model 274 and Hi_Model 276 to Routing Parser 326 (for C and H models). Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators Endpoint Checker 322 and Tenant Routing Checker 324. Endpoint Checker 322 can communicate information related to Endpoint violations, such as duplicate IPs, APIPA, etc. to an event generator capable of generating events for external consumption or monitoring. Similarly, Tenant Routing Checker 324 can communicate information related to the deployment of BDs, VRFs, subnets, routing table prefixes, etc. to the same or different event generator capable of generating events for external consumption or monitoring.

Figure 3C:
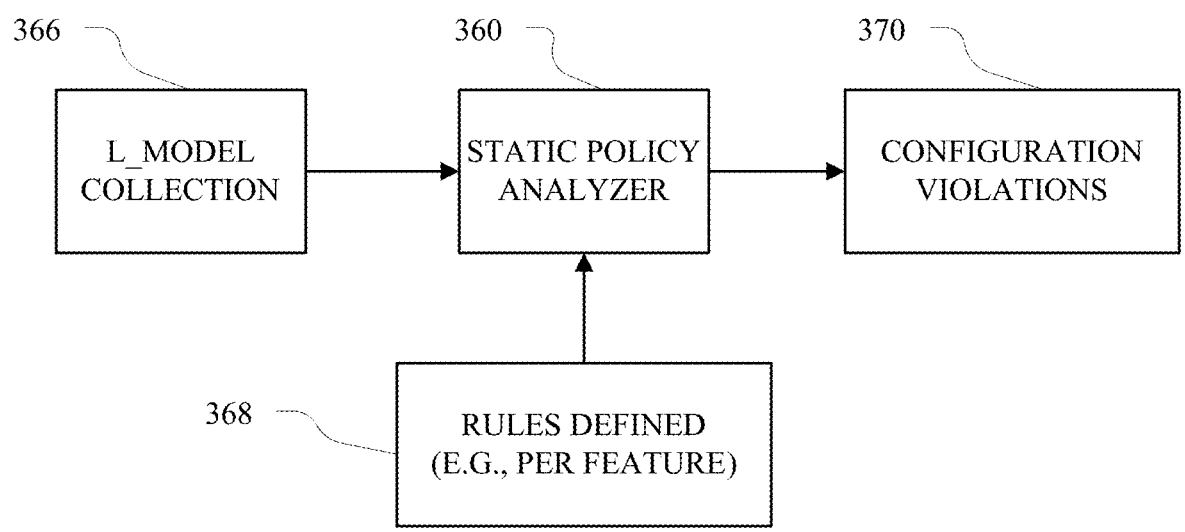
FIG. 3C illustrates a schematic diagram of an example system for static policy analysis in a network.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have shadowing issues, Rule1 can be more specific than Rule2 and thereby create conflicts/issues, etc. Rules 368 can define conditions which may result in shadowed rules, conflicting rules, etc. To illustrate, Rules 368 can specify that a permit policy for a specific communication between two objects can conflict with a deny policy for the same communication between two objects if the permit policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased/shadowed rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

Figure 4:
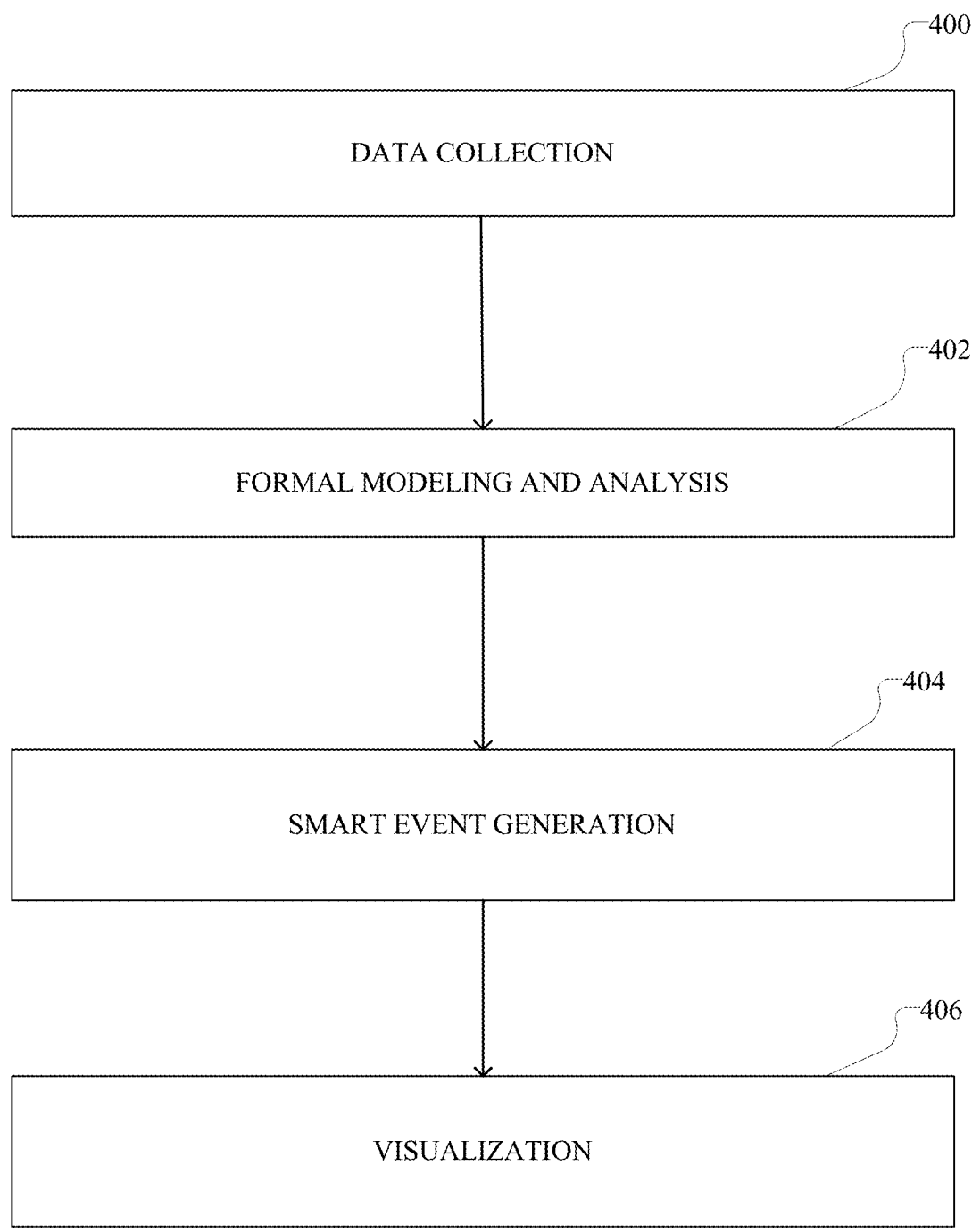
FIG. 4 illustrates an example method embodiment for network assurance and fault code aggregation.

FIG. 4 illustrates an example flowchart for a network assurance model. At step 400, the method involves data collection. Data collection can include collection of data for operator intent, such as fabric data (e.g., topology, switch, interface policies, application policies, endpoint groups, etc.), network policies (e.g., BDs, VRFs, L2 Outs, L3 Outs, protocol configurations, etc.), security policies (e.g., contracts, filters, etc.), service chaining policies, and so forth. Data collection can also include data for the concrete, hardware model, such as network configuration (e.g., RIB/FIB, VLAN, MAC, ISIS, DB, BGP, OSPF, ARP, VPC, LLDP, MTU, QoS, etc.), security policies (e.g., TCAM, ECMP tables, etc.), endpoint dynamics (e.g., EPM, COOP EP DB, etc.), statistics (e.g., TCAM rule hits, interface counters, bandwidth, etc.).

At step 402, the method can involve formal modeling and analysis. Formal modeling and analysis can involve determining equivalency between logical and hardware models, such as security policies between models, etc.

At step 404, the method can involve smart event generation. Smart events can be generated using deep object hierarchy for detailed analysis, such as: Tenant, Leaf, VRFs, Rules; Filters, Routes, Prefixes, Port Numbers.

At step 406, the method can involve visualization. Formal models can be used to identify problems for analysis and debugging, in a user-friendly GUI.

Each of the previously described models (Li, Ci, and Hi) is, in one way or another, derived from the initial L-model that is configured by a user or network operator at the APIC or network controllers. For example, the Li model is a logical projection of the fabric-wide L model onto each leaf, spine, switch, node, etc. i in the network fabric; the Ci model is a concrete rendering of the L-model into a format that is compatible with the aforementioned fabric elements; and the Hi model is the hardware representation of the Ci model, as stored into switch memory by a switch memory controller.

Accordingly, each transformation used to derive the Li, Ci, and Hi models presents an opportunity for error or misconfiguration, which is undesirable from a network operator's point of view. These errors can result due to software bugs, user error, hardware variance, memory errors, overflow issues, and other causes that would be appreciated by one of ordinary skill in the art. In some embodiments, each model may consist of thousands, or tens of thousands, of distinct rules that collectively represent the intents configured in the original L-model, and each of these distinct rules must be preserved when converting between the different models.

Previous approaches to validating the Li, Ci, and Hi models relied upon brute force, treating each model as a black box and simply comparing the outputs from the models when given the same input. Such an approach can indicate a lack of equivalence if two models produce a different output for the same given input, but cannot provide any insight as to why there is a conflict. In particular, the black box approach is unable to provide specific information regarding the specific rules in each model that are in conflict, or specific information regarding the specific contract or intent configured by a user or network operator that ultimately led to the conflict arising.

Rather than employing brute force to determine the equivalence of two input models of network intents, the network intent models can instead be represented as Reduced Ordered Binary Decision Diagrams (ROBDDs), where each ROBDD is canonical (unique) to the input rules and their priority ordering. Each network intent model is first converted to a flat list of priority ordered rules (e.g. contracts defined by a customer or network operator are defined between EPGs, and rules are the specific node-to-node implementation of these contracts). In the example architecture 500 for a formal analysis engine 502 depicted in FIG. 5, flat lists of priority ordered rules for a plurality of models of network intents 506 (illustrated here are the models Li, Hi, and Ci) are received as input at an ROBDD Generator 530 of a formal analysis engine 502. These rules can be represented as Boolean functions, where each rule consists of an action (e.g. Permit, Permit_Log, Deny, Deny_Log) and a set of conditions that will trigger that action (e.g. various configurations of packet source, destination, port, header, etc.). For example, a simple rule might be designed as Permit all traffic on port 80. In some embodiments, each rule might be a 147 bit string, with 13 fields of key-value pairs.

As illustrated, ROBDD Generator 530 generates one or more ROBDDs for each input model. In particular, an ROBDD can be generated for each action encoded by the constituent rules of an input model, or each action that might possible be encoded by the rules, such that there is a one-to-one correspondence between the number of actions and the number of ROBDDs generated for a given input model. For example, Li might be used to generate the ROBDDs $L\_Permit_{BDD}$, $L\_Permit\_Log_{BDD}$, $L\_Deny_{BDD}$, and $L\_Deny\_Log_{BDD}$, with similar ROBDDs being generated for the input models Hi and Ci. It is noted that within these ROBDDs, rules can be represented in their full (i.e. original) form, represented in a priority reduced form, or both. The full form is simply the form in which the rules were originally entered or created, and includes any overlaps or redundancies between separate rules. A priority reduced form removes the redundancies and overlaps, based on a given priority or hierarchical ordering of the rules. In this sense, a given rule has only a single full form, but can have numerous different priority reduced forms, depending on the priority listing that was used for the overall set of rules to which the given rule belongs.

When rules are represented in their priority reduced form, only the unique contribution of a given rule in light of all higher priority rules is considered. For the set of rules L1, L2, L3, L4, this priority reduced form would be given by L1, L1'L2, (L1+L2)'L3, (L1+L2+L3)'L4, wherein L1' denotes the inverse of L1, (L1+L2)' denotes the inverse of the combination of L1 and L2, and so on. In this fashion, the rules considered in the semantic analysis described herein can in fact be priority reduced rules rather than full rules. For the same set of rules, but with the priority order L4, L3, L2, L1, the priority reduced form would be given by L4, L4'L3, (L4+L3)'L2, (L4+L3+L2)'L1. Thus, while in every case priority reduced rules remove any redundancies or overlaps between the conditions and actions encompassed by the rule sets, the priority order relies upon matters. Consequently, it can be advantageous for each ROBDD representation discussed herein to include both full and reduced representations. While reduced representations are more computationally efficient to work with, and reduced representations are the primary form of rule utilized in the analysis described herein, various different priority orderings are often needed, and thus it is helpful to maintain the full base representation from which priority reduced representations can be generated as needed.

From these ROBDDs, the formal equivalence of any two or more ROBDDs of network intent models (typically ROBDDs corresponding to the same action) can be checked via Equivalence Checker 540. Formal equivalence can be checked by building one or more conflict ROBDDs for the two or more input network intent models, such as the illustrated input pairs ($L_{BDD}$, $H_{BDD}$), ($L_{BDD}$, $C_{BDD}$), and ($H_{BDD}$, $C_{BDD}$). It is noted that these input pair representations are used for clarity purposes, and any of the inputs $L_{BDD}$, $H_{BDD}$, $C_{BDD}$ may be replaced with any of the action-specific ROBDDs discussed above. For example, the comparison ($L_{BDD}$, $H_{BDD}$) might actually comprise four separate inputs, one for each action (e.g. $L\_Permit_{BDD}$, $H\_Permit_{BDD}$, etc) which would lead to four separate action-specific conflict ROBDDs. Regardless, if a given conflict ROBDD between the inputs is empty, then the inputs are determined as equivalent, causing Equivalence Checker 540 to generate a "PASS" indication 554.

However, if a given conflict ROBDD is not empty, then it is determined that the input models are not equivalent, and Equivalence Checker 540 can output one or more conflict ROBDDs 542 to a Conflict Rules Identifier 550. Conceptually, the one or more conflict ROBDDs 542 encode the areas of conflict or contradiction between input ROBDDs, i.e. the instances in which the input ROBDDs trigger different actions for the same input packet and network conditions. For example Equivalence Checker 540 can build a Permit conflict ROBDD between $L\_Permit_{BDD}$ and $H\_Permit_{BDD}$ by calculating the exclusive disjunction between the two models:

$$L\_Permit_{BDD} \oplus H\_Permit_{BDD} \text{(i.e. } L\_Permit_{BDD} \text{XOR } H\_Permit_{BDD}\text{)}$$

Equivalence Checker 540 then transmits the one or more conflict ROBDDs 542 to a Conflict Rules Identifier 550. As illustrated, Conflict Rules Identifier 550 can additionally receive the underlying models 506 of network intents Li, Hi, and Ci. Continuing the previous example wherein a Permit conflict ROBDD is calculated for $L\_Permit_{BDD}$ and $H\_Permit_{BDD}$, specific conflict rules 552 are identified by iterating over $H\_Permit_{BDD}$ and calculating the intersection between each given individual constituent rule of $H\_Permit_{BDD}$ and the Permit conflict ROBDD. If the intersection is non-zero, then the given rule of $H\_Permit_{BDD}$ is a conflict rule. A similar process can be performed for each individual constituent rule of $L\_Permit_{BDD}$, thereby forming a listing of conflict rules 552 for each model of network intents that is represented in the Permit conflict ROBDD (i.e. conflict ROBDD 542).

It is also possible that Conflict Rules Identifier 550 treats one of the input models 506 of network intents as a reference standard, where the model is assumed to be correct or otherwise not the source of any conflicts or errors. In this case, Conflict Rules Identifier 550 needs only to compute the intersection of the Permit conflict ROBDD and the set of Permit rules from the non-reference model. For example, the Li-model of user intents can be treated as a reference or standard, because it is directly derived from user inputs. The Hi-model, on the other hand, passes through several transformations before ultimately being rendered into a hardware form by a switch memory controller, and is therefore much more likely to be subject to error. Accordingly, Conflict Rules Identifier 550 would only compute:

$$(L\_Permit_{BDD} \oplus H\_Permit_{BDD})*Hj$$

for each of the rules (or each of the Permit rules) j in the Hi-model, which can cut the required computation time roughly in half.

Regardless of whether conflict rules 552 are identified for both input models of network intent, or only the non-reference model of network intent, Conflict Rules Identifier 550 then outputs the calculated conflict rules 552 to a Counterexample Generator 560. In some embodiments, the listing of conflict rules 552 might contain action-specific conflict rules pairs, e.g. five pairs of Permit conflict pairs, two pairs of Deny conflict pairs, etc. In some embodiments, the listing of conflict rules 552 might be action-specific, such that each action has its own listing of conflict rules. It is appreciated that, in general, when the above described analysis is performed on an action-specific basis, that the computation can be parallelized to at least the degree of the number of different actions present, e.g. in a comparison of Li and Hi models, the Permit, Permit_Log, Deny, Deny_Log actions and associated action-specific conflict ROBDDs/conflict rules 552 can be generated in side-by-side fashion. In some embodiments, the conflict rules 552 may additionally be output externally from formal analysis engine 502, for purposes such as event generation or external consumption.

In general, this listing of conflict rules 552 is organized in a paired form, wherein a conflict rule from a first model (e.g. Li) is paired with a corresponding one or more rules from a second model (e.g. Hi) that specifically conflict with the conflict rule from the first model. For example, rule L2 in Li might conflict with rule H2 in Hi, and would be transmitted as the conflict pair (L2; H2). Likewise, rule L4 in Li might conflict with both rules H4 and H5 in Hi, and would be transmitted as the conflict pair (L4; H4, H5). In this manner, Counterexample Generator 560 can immediately begin generating counterexamples for each specific conflict pair received from Conflict Rules Identifier 550. Alternatively, the process of identifying specific conflict pairs may be performed by Counterexample Generator 560 rather than Conflict Rules Identifier 550. In this case, Conflict Rules Identifier 550 would simply transmit separate listings of conflict rules for each model Li, Hi, etc., to Counterexample Generator 560, rather than transmitting a single listing of conflict pairs.

Counterexample Generator 560 can manipulate and mine the listing of conflict pairs 552 for information corresponding to various counterexample driven workflow scenarios, including but not limited to: Automated Test Packet Generation (ATPG) regions, exhaustive or parameterized per-EPG-pair conflict rule identification, exhaustive or parameterized per-EPG-pair region mismatches, conflict fields per counterexample, suggested fixes for rulesets, and semantic policy difference analysis for change management.

The disclosure now turns to several examples of counterexample generation that can be performed by Counterexample Generator 560. In a first example, consider the conflict pair (L2; H2), with:
L2: {sg_label=0x1; sclass=0x1; dclass=0x2; sport=[0x0-0x1]; action=PERMIT}
H2: {sg_label=0x1; sclass=0x1; dclass=0x2; sport=0x0; action=PERMIT}.
This is a Permit conflict pair, where the two rules L2 and H2 are both Permit rules but do not trigger over an identical set of parameters or packet conditions. For this specific conflict pair of (L2; H2), PERMIT equivalence fails because L2 has sport=[0x0-0x1] while H2 has sport=0x0.

As such, Counterexample Generator 560 will generate a counterexample CEx for the input conflict pair (L2; H2), with:
CEx: ({sg_label=0x1; sclass=0x1; dclass=0x2; sport=0x1}, L2 action=PERMIT, H2 action=!PERMIT).
This counterexample CEx represents a packet configuration that causes rule L2 to trigger and permit the packet, while rule H2 does not trigger and does not permit the packet (noting that the action !PERMIT is not necessarily the same as the action DENY, but is instead all actions that are not a PERMIT action). Such information is valuable to a network operator or from a more general network assurance perspective because conflict rules are oftentimes not readily apparent or otherwise observable.

For example, a packet with
{sg_label=0x1; sclass=0x1; dclass=0x2; sport=0x0}
would be permitted by both rules L2 and H2 without any conflict manifesting itself, even though there is an equivalency/congruency failure between rules L2 and H2. Through Counterexample Generator 560, a network operator is able to more comprehensively understand all possible packet configurations that may present themselves, and therefore understand the possible conflicts that may present themselves, in a manner that was previously not possible.

In the analysis performed by Counterexample Generator 560, both rulesets L2 and H2 are considered suspect across all fields. However, some fields may be ruled out with a high probability. For example, static fields are those in which there is little to no possibility for adjustment, i.e. where any tweaks will make a conflict situation worse. In the context of the present example, sg_label=0x1; sclass=0x1; dclass=0x2 are static fields, identically configured in L2 and H2. Hot fields are those containing the probable root cause of the conflict. In the context of the present example, sport (or sport=0x1) is the hot field, which is not identically configured in L2 and H2.

In general, Counterexample Generator 560 provides a consumable counterexample output 562 with erroneous-field localization for an input conflict pair. That is,
CEx: {sg_label=0x1; sclass=0x1; dclass=0x2; sport=0x1}
is output along with an indication that sport=0x1 is the erroneous (hot) field causing the conflict, while sg_label=0x1; sclass=0x1; dclass=0x2 are static fields not causing the conflict.

The counterexample CEx is calculated as the logical exclusive disjunction between the input conflict pair over the set of possible packet configurations and network conditions. In the present example, CEx=L2⊕H2, as CEx represents the only possible conflict scenario between rules L2 and H2. However, this is rarely the case in real world conditions, where conflict pairs are typically associated with a large number of possible conflict scenarios.

For example, consider the Permit conflict pair (L3; H3), with:
L3: {sg_label=0x1; sclass=0x1; dclass=0x2; sport=0x1; action=PERMIT}
H3: {sg_label=0x1; sclass=0x1; dclass=0x2; sport=0x0; action=PERMIT}.
Here, there are two possible counterexamples:
$CEx_1$: ({sg_label=0x1; sclass=0x1; dclass=0x2; sport=0x1}, L3 action=PERMIT, H3 action=!PERMIT)
$CEx_2$: ({sg_label=0x1; sclass=0x1; dclass=0x2; sport=0x0}, L3 action=!PERMIT, H3 action=PERMIT),
where the bolded field 'sport' indicates the hot field in both counterexamples.

In the case of multiple conflict scenarios (and multiple counter examples), it is important to note that any potential fixes must be mutually exclusive, e.g. either rule L3 can be adjusted to have sport=0x0, or rule H3 can be adjusted to have sport=0x1, but not both. Under an additive/permissive model of suggested fixes, fixes are suggested such that all hot fields or counterexample regions result in a PERMIT (or other desired action). Under a subtractive/restrictive model of suggested fixes, fixes are suggested such that all fields or counterexample regions result in a !PERMIT (or !<other desired action>). As mentioned previously, one ruleset may be configured as a reference or standard, such that it is never subject to a suggested fix. An approach making use of all three of the above factors may be utilized, in order to most effectively avoid suggesting fixes that cancel or nullify one another, or fixes that cancel, alias, shadow, or otherwise conflict with other pre-existing rules. In general, a suggested fix should not create new or additional conflicts, in order to avoid precipitating further inequivalence and ping-ponging of fixes back and forth.

The two examples discussed above both present a symmetric field error, wherein the counterexamples only contain a single hot field (e.g. sport). However, real world conditions often involve multi-field errors, wherein the counterexamples contain multiple hot fields.

Consider a third example for the PERMIT conflict pair (L4; H4), with:
L4: {sg_label=0x1; sclass=0x1; dclass=[0x1-0x2]; sport=0x0; action=PERMIT} H4: {sg_label=0x1; sclass=0x1; dclass=0x2; sport=0x1; action=PERMIT}.
Here, both dclass and sport are hot fields in the three possible counterexamples $CEx_3$, $CEx_4$, $CEx_5$, as indicated in bold. In particular:
$CEx_3$=({sg_label=0x1; sclass=0x1; dclass=0x2; sport=0x0}, L4 action=PERMIT, H4 action=!PERMIT)
$CEx_4$=({sg_label=0x1; sclass=0x1; dclass=0x1; sport=0x0}, L4 action=PERMIT, H4 action=!PERMIT)
$CEx_5$=({sg_label=0x1; sclass=0x1; dclass=0x2; sport=0x1}, L4 action=!PERMIT, H4 action=PERMIT)

It can be desirable that Counterexample Generator 560 outputs counterexamples that are representative of all possible hot fields. For example, $CEx_4$ is the only counter example above that encodes both dclass and sport as hot fields. The other two possible counterexamples $CEx_3$ and $CEx_5$ fail to indicate that dclass is also a possible hot field for the Permit conflict pair (L4; H4).

As such, Counterexample Generator 560 can be configured to first output counterexamples 562 that encode all possible hot fields, such that a user or network operator can more fully understand the scenarios in which conflicts can occur. Counterexample Generator 560 can additionally be configured to output counterexamples 562 that are focused only a certain subset of possible packet configuration parameters. Such preferences can be specified via a truncation parameter 572 that is received as a user input to Truncation Logic 570, illustrated here as a sub-component of Counterexample Generator 560.

Truncation Logic 570 can additionally specify a desired number of counterexamples 562 to be generated by Counterexample Generator 560. In other words, Counterexample Generator 560 can be configured to only compute a small portion of the entire space of counterexamples contained within the logical exclusive disjunction for a conflict pair. For example, Truncation Logic 570 might cause Counterexample Generator 560 to only return counterexamples 562 that encode all possible hot fields, and to cease processing after all such counterexamples have been provided. In doing so, Truncation Logic 570 avoids a lengthy and resource-intensive exhaustive computation of all possible counterexamples for a conflict rule pair, which in the real world could number into the thousands. While reference is made here to a truncation parameter 572 that is defined by characteristics of the counterexamples and the overall space from which they are drawn, it is also contemplated that truncation parameter 572 may be a numerical value that is not necessarily related to or otherwise defined by characteristics of the counterexamples and the overall space from which they are drawn.

The disclosure now turns to FIGS. 6 and 7, which illustrate example network devices and computing devices, such as switches, routers, load balancers, client devices, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL x86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:
1. A computer-implemented method comprising:
obtaining a listing of conflict rules corresponding to an equivalence failure between a first model of network intents and a second model of network intents, the listing of conflict rules including one or more first conflict rules from the first model of network intents and one or more second conflict rules from the second model of network intents, the first model of network intents and the second model of network intents describing operation and communication between one or more network devices in a network;

calculating a logical exclusive disjunction between the one or more first conflict rules and the one or more second conflict rules, the one or more first conflict rules and the one or more second conflict rules including at least one conflict rule pair;

generating one or more counterexamples corresponding to the equivalence failure, the one or more counterexamples based at least in part on the logical exclusive disjunction, the one or more counterexamples including a first counterexample with network and packet conditions that cause the first conflict rules to trigger a first action and cause the second conflict rules to trigger a second action that is different from the first action, the first one of the one or more counterexamples including a plurality of fields; and identifying hot fields, among the plurality of fields in the first counterexample, more likely to be associated with the equivalence failure relative to any other ones of the plurality of fields in the first counterexample.

2. The method of claim 1, wherein the listing of conflict rules includes a first listing corresponding to the first model of network intents and a second listing corresponding to the second model of network intents.

3. The method of claim 1,
wherein,
the conflict rule pair includes one or more first conflict rules corresponding to the first model of network intents and one or more second conflict rules corresponding to the second model of network intents, and
the one or more first conflict rules and the one or more second conflict rules associated with a same underlying network intent.

4. The method of claim 1, further comprising:
obtaining a truncation parameter specifying a maximum number of the one or more counterexamples to be generated, such that the logical exclusive disjunction is not calculated in full.

5. The method of claim 4, wherein the truncation parameter is calculated based on one or more characteristics of the logical exclusive disjunction.

6. The method of claim 1, further comprising:
generating suggested fixes for the one or more counterexamples and the hot fields, the suggested fixes configured to cause the logical exclusive disjunction between the first conflict rules and the second conflict rules to become zero when the suggested fixes are implemented.

7. The method of claim 1, wherein one or more of the first and second models is specific to network intents corresponding to a Permit, Permit_Log, Deny, or Deny_Log action.

8. A system comprising:
one or more processors; and
at least one computer-readable storage medium having stored therein instructions which, when executed by the one or more processors, cause the system to:
obtain a listing of conflict rules, corresponding to an equivalence failure between a first model of network intents and a second model of network intents, the listing of conflict rules including one or more first conflict rules from the first model of network intents and one or more second conflict rules from the second model of network intents, the first model of network intents and the second model of network intents describing operation and communication between one or more network devices in a network;

calculate a logical exclusive disjunction between the one or more first conflict rules and the one or more second conflict rules, the one or more first conflict rules and the one or more second conflict rules including at least one conflict rule pair;

generate one or more counterexamples corresponding to the equivalence failure, the one or more counterexamples based at least in part on the logical exclusive disjunction, the one or more counterexamples including a first counterexample with network and packet conditions that cause the first conflict rules to trigger a first action and cause the second conflict rules to trigger a second action that is different from the first action, the first one of the one or more counterexamples including a plurality of fields; and identify hot fields, among the plurality of fields in the first counterexample, more likely to be associated with the equivalence failure relative to any other ones of the plurality of fields in the first counterexample.

9. The system of claim 8, wherein the listing of conflict rules includes a first listing corresponding to the first model of network intents and a second listing corresponding to the second model of network intents.

10. The system of claim 8,
wherein,
the conflict rule pair includes one or more first conflict rules corresponding to the first model of network intents and one or more second conflict rules corresponding to the second model of network intents, and
the one or more first conflict rules and the one or more second conflict rules are associated with a same underlying network intent.

11. The system of claim 8, wherein the instructions further cause the system to obtain a truncation parameter specifying a maximum number of the one or more counterexamples to be generated, such that the logical exclusive disjunction is not calculated in full.

12. The system of claim 11, wherein the truncation parameter is calculated based on one or more characteristics of the logical exclusive disjunction.

13. The system of claim 11, wherein the instructions further cause the system to generate suggested fixes configured to cause the logical exclusive disjunction between the first conflict rules and the second conflict rules to become zero when the suggested fixes are implemented.

14. The system of claim 11, wherein one or more of the first and second models is specific to network intents corresponding to a Permit, Permit_Log, Deny, or Deny_Log action.

15. A non-transitory computer-readable storage medium comprising:
instructions stored therein instructions which, when executed by one or more processors, cause the one or more processors to:
obtain a listing of conflict rules corresponding to an equivalence failure between a first model of network intents and a second model of network intents, the listing of conflict rules including one or more first conflict rules from the first model of network intents and one or more second conflict rules from the second model of network intents, the first model of network intents and the second model of network intents describing operation and communication between one or more network devices in a network;

calculate a logical exclusive disjunction between the one or more first conflict rules and the one or more second conflict rules, the one or more first conflict rules and the one or more second conflict rules including at least one conflict rule pair;

generate one or more counterexamples corresponding to the equivalence failure, the one or more counterexamples based at least in part on the logical exclusive disjunction, the one or more counterexamples including a first counterexample with network and packet conditions that cause the first conflict rules to trigger a first action and cause the second conflict rules to trigger a second action that is different from the first action, the first one of the one or more counterexamples including a plurality of fields; and identify hot fields, among the plurality of fields in the first counterexample, more likely to be associated with the equivalence failure relative to any other ones of the plurality of fields in the first counterexample.

16. The non-transitory computer-readable storage medium of claim 15, wherein the listing of conflict rules includes a first listing corresponding to the first model of network intents and a second listing corresponding to the second model of network intents.

17. The non-transitory computer-readable storage medium of claim 15, wherein, the conflict rule pair includes one or more first conflict rules corresponding to the first model of network intents and one or more second conflict rules corresponding to the second model of network intents, and the one or more first conflict rules and the one or more second conflict rules are associated with a same underlying network intent.

18. The non-transitory computer-readable storage medium of claim 15, wherein the instructions further cause the one or more processors to obtain a truncation parameter specifying a maximum number of the one or more counterexamples to be generated, such that the logical exclusive disjunction is not calculated in full.

19. The non-transitory computer-readable storage medium of claim 18, wherein the truncation parameter is calculated based on one or more characteristics of the logical exclusive disjunction.

20. The non-transitory computer-readable storage medium of claim 15, wherein the instructions further cause the one or more processors to generate suggested fixes configured to cause the logical exclusive disjunction between the first conflict rules and the second conflict rules to become zero when the suggested fixes are implemented.

* * * * *